United States Patent
Deal

(10) Patent No.: US 6,554,036 B1
(45) Date of Patent: Apr. 29, 2003

(54) SIMPLIFICATION OF MOUNTING AND DEMOUNTING OF A TIRE ON AND OFF ITS RIM

(75) Inventor: Michel Deal, Saint-Remy-en-Rollat (FR)

(73) Assignee: Compagnie Générale des Etablissments Michelin & Cie, Clermont-Ferrand Cedex (FR)

( * ) Notice: Subject to any disclaimer, the term of this patent is extended or adjusted under 35 U.S.C. 154(b) by 0 days.

(21) Appl. No.: 09/396,869

(22) Filed: Sep. 15, 1999

Related U.S. Application Data

(63) Continuation of application No. PCT/EP99/00175, filed on Jan. 14, 1999.

(30) Foreign Application Priority Data

Jan. 20, 1998 (FR) .............................. 98 00635

(51) Int. Cl.[7] .................. B60C 15/028; B60C 15/02; B60C 3/02; B60B 21/12
(52) U.S. Cl. .................. 152/514; 152/375; 152/379.3; 152/379.5; 152/400; 301/95.104
(58) Field of Search ............................ 152/279, 381.3, 152/405, 409, 410, DIG. 10, 396, 398, 283, 453, 515, 388, 375, 378 R, 379.3, 379.4, 379.5, 158, 399, 400, 307; 29/453; 301/35, 95, 96, 97, 95.161, 95.102, 95.11, 99, 95.104

(56) References Cited

U.S. PATENT DOCUMENTS

| | | | | |
|---|---|---|---|---|
| 539,586 A | * | 5/1895 | Long | 152/379.3 |
| 607,043 A | * | 7/1898 | James | 152/514 |
| 1,090,727 A | * | 3/1914 | Leach | 152/384 |
| 1,333,679 A | * | 3/1920 | Rey | 152/515 |
| 1,579,059 A | * | 3/1926 | Austin | 152/405 |
| 1,900,835 A | * | 3/1933 | Meredith | 152/379.3 |
| 2,519,937 A | | 8/1950 | Sinclair | |
| 2,874,748 A | | 2/1959 | Powers | |
| 3,913,653 A | | 10/1975 | Verdier | |
| 4,163,466 A | * | 8/1979 | Watts | 152/158 |
| 4,453,583 A | | 6/1984 | Smith | |
| 4,574,859 A | | 3/1986 | Smith | |
| 4,682,640 A | * | 7/1987 | Berger | 152/405 |
| 5,000,240 A | * | 3/1991 | Jones, Jr. | 152/379.5 |

FOREIGN PATENT DOCUMENTS

| | | | |
|---|---|---|---|
| DE | 2360516 | * | 6/1974 |
| EP | 0133150 | * | 2/1985 |
| EP | 0382912 | * | 8/1990 |
| EP | 0633150 | * | 1/1995 |
| FR | 2154361 | | 5/1973 |
| JP | 58004609 | * | 1/1983 |

* cited by examiner

Primary Examiner—Steven D. Maki
Assistant Examiner—Justin Fischer
(74) Attorney, Agent, or Firm—Baker Botts L.L.P.

(57) ABSTRACT

An assembly of a rim and a closed toroidal tire. The tire includes a tire casing and a ring, defining a tight chamber. The ring provides a mounting base on the rim and forms a sleeve designed to rest on said rim in mounting position. The ring includes a protuberance having a locking surface, intended to be engaged in a complementary groove arranged on the rim in order to oppose any relative movement between tire and rim axially in at least one direction. The ring has such a degree of flexibility that a pressure reduction of the chamber causes a displacement of said protuberance toward a larger radius. The tire can, for example, be fitted on the rim, and then the vacuum can be eliminated so that the protuberance will be engaged in the groove.

31 Claims, 15 Drawing Sheets

SIMPLIFICATION OF MOUNTING AND DEMOUNTING OF A TIRE ON AND OFF ITS RIM

This is a continuation of international application PCT/EP 99/00175 filed Jan. 14, 1999, which was published in French on Jul. 29, 1999 as international publication WO 99/37491 and which claims priority of French application 98/00635 filed Jan. 20, 1998.

BACKGROUND OF INVENTION

The present invention relates to tires. In particular, it concerns the mounting and demounting of a tire casing on and off a rim, and it also concerns, consequently, the mounting and demounting of tire casings on a vehicle, for example, for their replacement.

It is known that the development of wheels equipped with tires has led to a trend in design which, at present, consists of making the wheel easily demountable from the vehicle, the tire being removable from the wheel in an operation carried out at the shop with specialized machines. As is well known, the wheel is demountable from the hub of a vehicle usually by unscrewing a set of bolts. The wheels, the rims and the beads of a tire casing are covered by manufacturing standards which dictate the outer shapes and dimensions of those parts (see, for example, the ETRTO in Europe).

Most wheel and tire assemblies are made according to the principle just mentioned. This is the case with almost all equipment for passenger vehicles. It is also the case with most equipment for trucks, construction machinery, fanning or logging equipment, etc. As far as the largest dimensions are concerned, for example, to equip construction machinery or earth movers, the assemblies are built according to comparable principles, except that the rim is generally made in several parts assembled by a large number of bolts. This corresponds to a tire casing section having the general appearance of a horseshoe ("Ω") open on the side of the axis of rotation of the tire, which proves simpler to manufacture than other types of sections (see, for example, the closed toroidal tire); the manufacturing facilities available have been developed and optimized for this type of tire. The open "Ω" shape is also appreciated because it makes it possible to inspect the inside of the casing and affords access to the inside of the casing in order to repair it, if necessary.

The present state of the art is the result of a technological evolution which, in the course of time, has been directed at offering tire and wheel assemblies which are as easy as possible to mount on and demount from the vehicle. Thus, the solution proposed for passenger vehicles makes possible the removal of the wheel and tire assembly from the hub simply enough to be within the ability of the ultimate user.

There have been very few technological developments in the course of the past decades concerning the principle of mounting a tire casing on the wheel and the principle of mounting the wheel on a vehicle. In some specific applications, such as wheel and tire assemblies for racing cars (like the Formula 1), in order to be able to mount and demount the equipment as quickly as possible, a center attachment wheel is used, making it possible to fasten the wheel to the hub of the vehicle very rapidly. But this type of fastening requires the use of very specific tightening and loosening wrenches, which are not available in most machine shops. The problem of wheel and tire equipment mounting and demounting time also arises for truck fleets or for construction equipment.

In the course of the specification, the expression "tire casing" is reserved for the object having two sidewalls attached to a crown part having a tread, the two sidewalls each ending radially inward in a bead. This is the commercial product as commonly manufactured nowadays. The part indeformable to working stresses, on which the tire casing is mounted, is called a "rim", the beads serving to position the tire on the seats of a rim. A "wheel" includes a rim and the means for mounting that rim on a hub, which is, for example, usually a wheel disk. As used herein, a "tire" is an assembly constituting a toroid delimiting a tight chamber that can be inflated to the normal working pressure provided for by the designer. A tire casing mounted on the rim is one of the possible ways of making a tire (in the meaning given to the word "tire" hereabove).

However it is made, the mounting of a tire casing on a rim consists of positioning the beads on the rim seats and against the rim flanges. Each rim seat requires centering (radially) and generally presents a slight conicity making possible a degree of tightening of the casing, when the bead is axially displaced toward and up to the flange, which requires of it an axial positioning relative to the fastening surface of the wheel on the hub of the vehicle. In other words, the rim seats can be considered positioning the beads relative to the axis of rotation of the rim, while the rim flanges position the bead relative to a reference perpendicular to the axis of rotation of the rim. In addition to the function of imposing a geometrically precise position for the bead of the tire casing, the rim seat and the rim flange also have the function of ensuring tightness between the rim and the tire casing, and have the function of making it possible, through sufficient tightening of the tire on its rim, to transmit a torque between the rim and the tire casing.

SUMMARY OF THE INVENTION

The object of the present invention is to simplify radically the mounting and demounting of a tire on and off the vehicle it equips. According to one aspect of the present invention, the mounting and demounting of a tire casing or of a tire on and off the rim supporting it do not necessitate a specialized mounting machine, like those making it possible to have the flange of the rim crossed by the beads of the tire casing, nor the tightening or loosening of a large number of bolts. The invention proposes a solution which makes it possible to fit a tire on a support that it will be convenient to call "rim" (because it is a support not deformable on working stresses) in a very simple manner: a simple relative transverse displacement between tire and rim suffices, the tire and rim remaining with merged axes during the relative translation movement.

The invention proposes a toroidal tire including, as seen in mounted position on a suitable rim:

a mounting base on the rim, said base forming a sleeve extending crosswise and being capable of forming a closed toroid defining a tight chamber, said base constituting the radially innermost wall of said toroid;

said base being intended to be mounted on the rim; securing means for axially opposing any relative movement of the tire on the rim at least in one of the two directions, said securing means being:

arranged on the radially inner face of the base;

designed to cooperate with a complementary bearing arranged on the rim in order to oppose any relative movement between tire and rim axially in the said direction at least;

arranged in a part of the base which presents a degree of flexibility between a relaxed natural position and a position radially stressed outward, in which those securing means are free of any engagement with the said complementary element, said part of the base and the securing means being so shaped and constituted that, when said chamber is at the same pressure as the atmospheric pressure prevailing outside the chamber, the securing means are engaged with the complementary element, so that the tire will be automatically secured in at least said one direction on the rim, release of the securing means requiring subjecting the latter to the action of outside means serving to make said securing means take said position stressed radially outward.

Depending on the applications, the "securing means" can take many different forms, some of which gives them the shape of a localized mechanical locking element, and others a more spread out shape. One designates here means which contribute to oppose any relative movement of the tire on the rim and which contribute to the security of the immobilization of the tire on its rim. Let us note also that the so-called "relaxed natural" position of the securing means can be different from the one they have when they are engaged with the complementary bearing of the rim, the latter (engaged position) generally being an intermediate position between the relaxed natural position and the position stressed radially outward, in which those securing means are free of any engagement with the said complementary element.

According to one particular embodiment, said securing means include a locking element made in the form of a protuberance or groove, arranged on the radially inner face of the base axially at an intermediate position, said locking element having a predetermined height (H) measured parallel to a radius from the inner face of the base, and the said complementary bearing arranged on the rim being adapted to said locking element.

It is known that a tire generally comprises a crown part comprising a tread. The concept of the invention having been defined above, let us point out how said degree of flexibility can be adjusted (through the choice of materials and design) for an excellent operation of the invention. It is advisable that, when the tire is in a closed toroid configuration defining a tight chamber, a pressure reduction of the chamber produces the desired displacement of said locking element toward the larger radius before producing a deformation of the crown, the extent of which opposes said displacement of the base to the larger radius. It is therefore advisable, through a judicious sizing of the locking element and of the base supporting it, as well as through a judicious sizing of the crown part (the rigidity of which must be sufficient), for the increase in diameter of the locking element not to impose overly great stresses or, in any case, for the crown part to stand up well enough not to collapse. Preferably, it is desirable for what is stated above to remain true regardless of the degree of wear of the tire, so that demounting can take place under the same conditions as mounting. However, as will be seen below, some applications of the invention do not resort to a pressure reduction of the inner chamber of the tire. Consequently, this aspect is not universal.

From another aspect, the invention proposes a combined toroid tire and rim assembly, said rim coming in a single piece and said toroid tire including, seen in mounting position on a suitable rim:

two sidewalls;

a mounting base on the rim, said base forming a sleeve extending crosswise from each sidewall in the direction of the other sidewall, the radially inner ends of the sidewalls being extended by said base:

a crown part comprising the tread and joined to the radially upper end of the sidewalls, in which said base:

is capable of forming a closed toroid defining a tight chamber, complementing the sidewalls and the crown part, even when the tire is not mounted on the rim;

includes a concurrent locking part on the rim, situated axially between the sidewalls, said concurrent locking part presenting, in stress-free state, a minimum perimeter (Pm), the rim having a support area in the radial projection of said base, when the tire is considered in mounting position on the rim, said support area presenting a minimal (Pjm) opposite the portion of the concurrent locking part and, axially on at least one side of the part presenting the minimum perimeter (Pjm), an area presenting a maximum perimeter (PjM) greater than (Pjm) and capable of receiving the toroidal tire on the rim, the total rim situated on said side presenting a perimeter no greater than (PjM) in any axial position, said minimum perimeter (Pm) of the concurrent locking part being less than the maximum rim perimeter (PjM), said concurrent locking part being elastically extensible, so that, when the tire is in place on the rim, the concurrent locking part cooperates with the rim in opposing any relative movement of the tire in relation to the rim at least axially toward said side.

Several embodiments of the invention are described below, which can be classified in three families:

The first family uses tire casings of appearance identical or very close to the shape of the tire casings in current use on the priority date of this invention. They are tire casings which are hooked on the rim against a flange situated axially outside the rim. The ETRTO standards in force on the priority date of this invention should be consulted, for example, to get more precise information on the standardized shape of the corresponding tire casing and rim beads.

A second family uses a tire casing having the general appearance of a toroid split in its radially inner wall.

Finally, a third family uses the principle of a tubular tire: it involves a toroid-shaped tire containing a tight closed cavity obtained on molding of the tire.

The second and third families propose developing a tire casing or closed tubular tire, not currently available today. As for the first family, it enables the today existing tire casings to be used, adding to them a ring specifically developed to form, by combination with a standard tire casing, a tire having the mounting and demounting properties proposed in the present invention.

The invention therefore also extends to a ring designed to be mounted under the beads of a tire casing having a crown, two sidewalls each ending in a bead, in order to form, after mounting of the beads on the ring, a tire designed to be mounted on an adapted rim, said ring including two seats, each receiving a bead, and including securing means for axially opposing any relative movement of the tire on the rim in one of the two directions at least, said securing means being:

arranged on the radially inner face of the ring;

designed to cooperate with a complementary bearing arranged on the rim in order to oppose any relative movement between tire and rim axially in the said direction at least;

arranged in a part of the ring which presents a degree of flexibility between a relaxed natural position and a position radially stressed outward, in which those securing means are free of any engagement with the said complementary element, said part of the base and the securing means being so shaped and constituted that:

when said chamber is at the same pressure as the atmospheric pressure prevailing outside the chamber, the securing means are engaged with the complementary element, so that the tire will be automatically secured in said one direction at least on the rim, the release of the securing means requiring subjecting the latter to the action of outside means serving to make said securing means take said position stressed radially outward.

As already explained above, the securing means can be a locking element taking the shape of a protuberance or groove, arranged on the radially inner face of the ring at a position axially separated from the seats, said locking element having a predetermined height (H) measured parallel to a radius from the inner face of the ring, the said complementary bearing arranged on the rim being adapted to said locking element. The remarks made above regarding the degree of flexibility are also applicable.

Through the choice of materials, design and sizing of the ring, it can very easily be given sufficient flexibility in the median part between the seats. There again and by comparison with the pliancy of the ring, the rigidity of the crown part must be sufficient for the reduction in pressure of the tire to produce an increase in diameter of the median part of the ring without the crown part collapsing.

In all the families, it is to be noted that the rim used is not tight or, more exactly, that it is the tire itself which has to be tight. Tightness is ensured between tire casing and ring in the first family and at the closure in the case of the second family (split toroidal tire). In other words, the air coming from the air chamber and that might have reached between the tire and the rim must be able to escape, so that there is no pressure build up between rim and mounting base. Such looseness of the rim can be obtained, for example, because the constituent material is porous, or because there are small vent holes judicially arranged, or because there are grooves correctly placed and oriented to the radially outer surface of the rim, or also because there are grooves correctly arranged and oriented to the radially inner surface of the mounting base. Other expedients can also be used, such as textile drains or a draining surface coating. Securing efficiency thereby does not change in time.

From another aspect, the invention proposes reducing the pressure of the inner cavity of a tire in order to increase in diameter or facilitate the increase in diameter of a portion of the mounting base, which makes it possible to fit the tire easily on the rim, the final securing of the tire on the rim being carried out by eliminating the vacuum.

This mounting by simple relative translation is done without prejudice to obtaining a securing in a strictly determined axial position. The invention therefore makes it possible to devise and carry out a secure fastening of the tire on its rim, while greatly simplifying mounting, compared to the known solutions which resort to a rim having a center mounting space, the minimum depth of which is dictated by the height of the rim flanges, as well as to a rim in several pieces, or to a previous insertion of the rim inside the beads with relative rotation of the planes of the rim and tire casing. For mounting of the tire on the rim as well as for demounting, the invention provides for reducing the pressure of the inner chamber of the tire during mounting and demounting. Outside of the mounting and demounting operation, the invention proposes a solution which, when the tire is at atmospheric pressures, makes sure of a retention of the tire on the rim that is as safe and positive as with the known solutions of the state of the art. In fact, at ambient atmospheric pressure, without express stresses (a vacuum in relation to ambient atmospheric pressure does not exist naturally), the tire cannot be demounted accidentally, while, in the case of passenger vehicle tire casings and their hollow-base rims, as ETRTO standardized on the priority date of the present application, in case of total deflation, it is not impossible that the bead or beads might be spontaneously engaged in the mounting groove and then pass over the rim flange (a phenomenon known as rolling off the rim).

The invention thus extends to a method of mounting on a rim of a closed toroidal tire forming a tight chamber, said tire including:

a rim mounting base, said base forming a sleeve intended to rest on said rim in mounting position;

securing means for axially opposing any relative movement of the tire on the rim in one of the two directions at least, said securing means being:

arranged on the radially inner face of the base;

designed to cooperate with a complementary bearing arranged on the rim in order to oppose any relative movement between tire and rim axially in the said direction at least;

arranged in a part of the ring which presents a degree of flexibility between a secured position and a radially outermost unsecured position;

said method including the following steps:

when the tire is in a closed toroidal configuration defining a tight chamber, reducing the pressure of the chamber until producing a sufficient displacement of the securing means toward the larger radius;

fitting or completing the fitting of said tire on said rim until it takes its final axial position relative to the rim;

eliminating the vacuum so that the securing means are displaced toward the smaller radius.

The invention also concerns a method of demounting off the rim of a closed toroidal tire forming a tight chamber, said tire including:

a rim mounting base, said base forming a sleeve intended to rest on said rim in mounting position;

securing means for axially opposing any relative movement of the tire on the rim in one of the two directions at least, said securing means being:

arranged on the radially inner face of the base;

designed to cooperate with a complementary bearing arranged on the rim in order to oppose any relative movement between tire and rim axially in the said direction at least, arranged in a part of the ring which presents a degree of flexibility between a secured position and a radially outermost unsecured position;

said method including the following steps:

creating a greater pressure acting on the tire between rim and tire than the pressure prevailing in the tight chamber, in order to produce a sufficient displacement of the securing means toward the larger radius;

removing said tire from said rim by sliding it axially.

In an advantageous use of the demounting method, in order to create a greater pressure between rim and tire than in the tight chamber, the pressure in said chamber is reduced, while the tire floats outside at atmospheric pressure. As a variant, in order to obtain a difference in pressure on both sides of the mounting base, instead of lowering the pressure prevailing in the tire chamber under atmospheric pressure, a fluid can also be injected under pressure between the rim and the mounting base, ideally in a place close to the securing means, which can be done, for example, through a vent hole provided on the rim, as explained above. Said securing means can also be possibly mechanically stressed, that is, pushed radially, in addition to or in place of a reduction of the pressure prevailing in the tire chamber. The methods of mounting and demounting described above propose a step in the course of which the toroidal tire slides by simple axial movement relative to the rim, without requiring a bead of a tire casing to be engaged in a mounting groove; these methods prove interesting and have broader applications than in connection with a tire according to the invention; for example, in case the tire should be well secured axially in relation to the rim, it is still necessary to perfect securing by creating a hooping or increasing the hooping of the base on the rim through inflation of the tire chamber; the fact of stressing said securing means radially toward the wider radii contributes to the relative axial movement between base and rim.

The invention will be better understood by the description to follow of several non-imitative examples, and by reference to the attached drawings:

DESCRIPTION OF PREFERRED EMBODIMENTS

Figure 1:
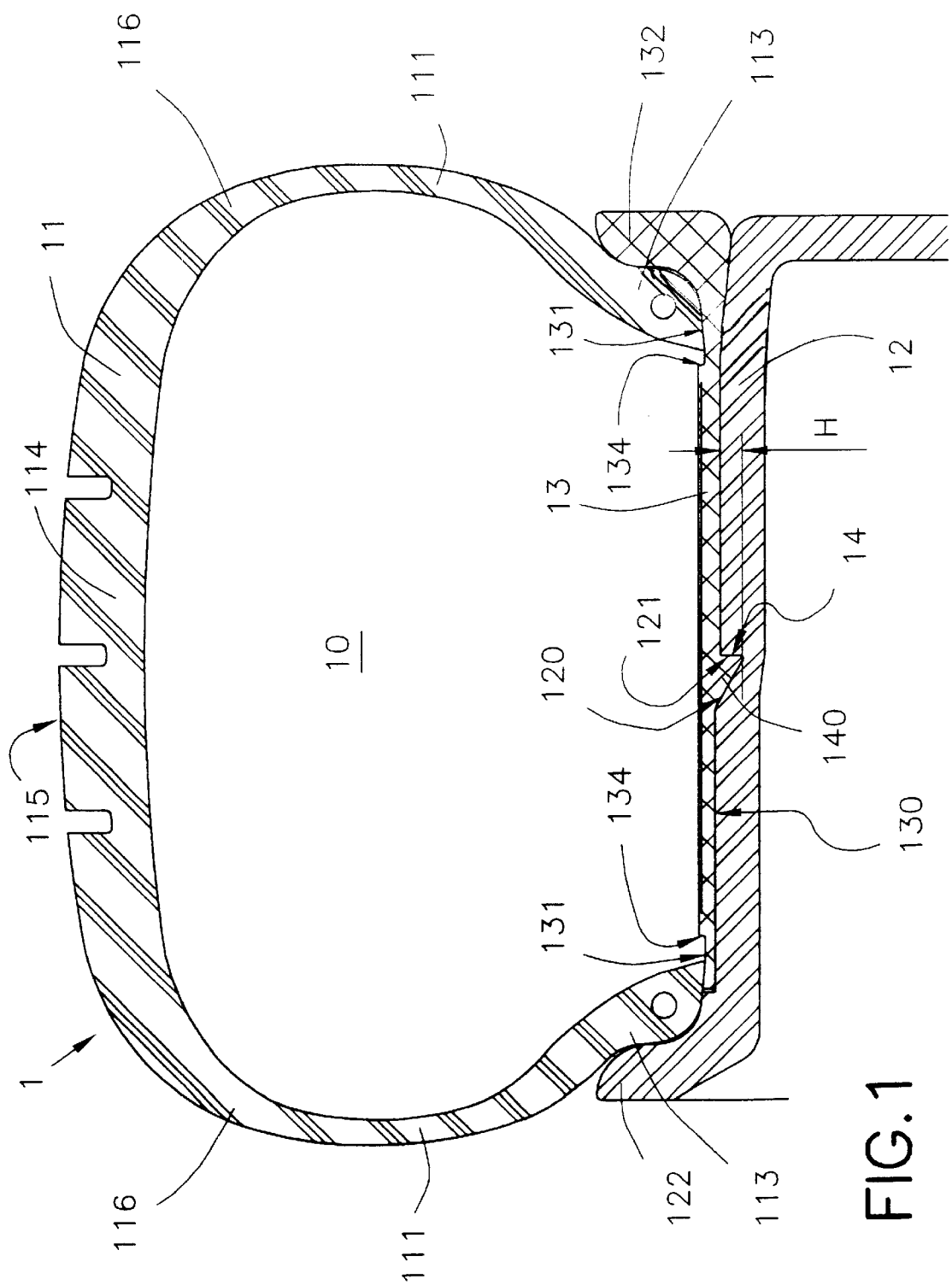
FIG. 1 shows a first variant of a tire and rim assembly belonging to the first family, represented in mounted position on the rim.
Figure 2:
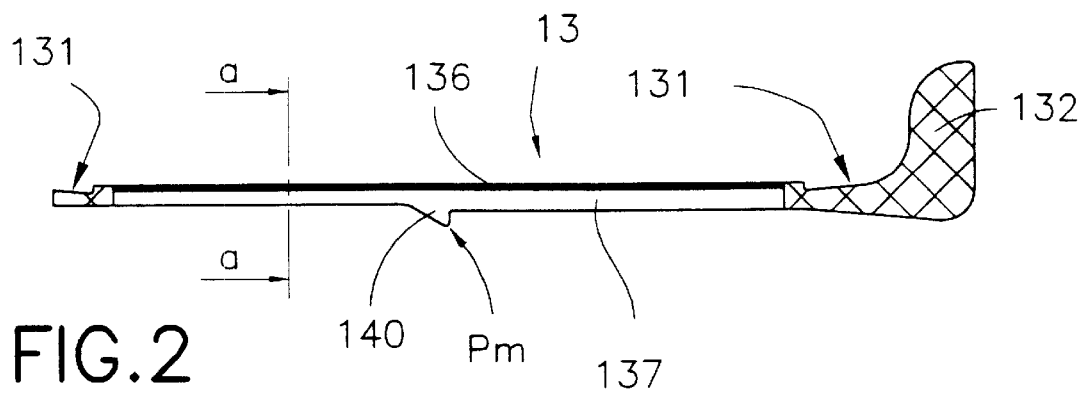
FIGS. 2 to 5 show in greater detail, the ring used in that first variant to form the rim mounting base making it possible to create a tire.
Figure 5:
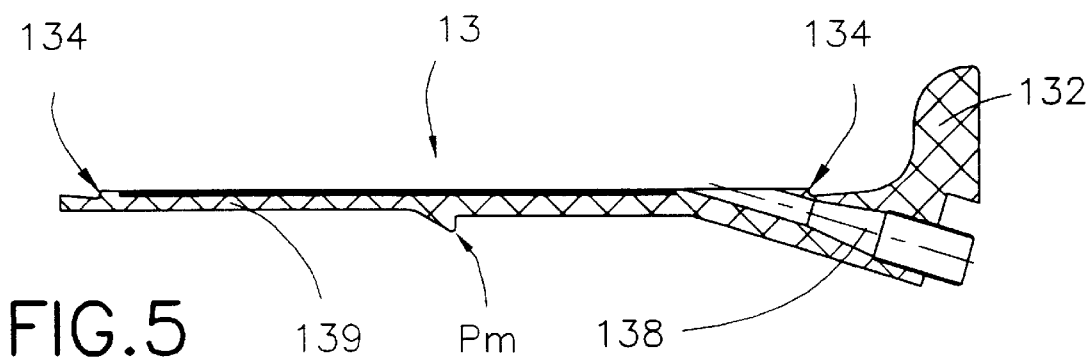

In FIG. 1, a tire casing 11 is shown having two sidewalls 111 joined at their radially upper end 116 to a crown part 114. The crown part 114 includes a tread 115. Each of the sidewalls 111 has, at its radially inner end, a bead 113. A ring 13 is shown, making it possible to join the beads 113 in order to form a tight inner cavity 10 typical of a tire 1. Said ring constitutes a mounting base. It is appreciably cylindrical in this embodiment. Said ring 13 includes two seats 131 on which each of the beads 113 can be mounted. Each of the seats 131 ends axially inward in a shoulder 134 comparable to the humps of standard rims for mounting tubeless tires. The ring 13 has a single flange 132 comparable to a rim flange, as known in the present state of the art. Since it includes only one flange 132, the ring 13 can be inserted inside and under the beads 113 of the tire casing 11 by simple relative translation (axes of the ring and tire casing merged), without having to impose severe deformations. The ring 13 includes a valve housing 138 (see FIG. 5) making it possible to bring the inner cavity 10 either under pressure or under vacuum.

If the valve used is capable of maintaining tightness, even when the inner chamber is under reduced pressure, it makes it possible. after having reached the desired reduced pressure level, to disconnect the tire from the vacuum source during the rim mounting operations. This constitutes a new requirement of the specifications in relation to the usual applications. It so happens that, at the low vacuum levels adequate for efficient operation of the invention, the spring of a standard passenger car tire valve can suffice.

According to the invention, the ring 13 can be secured on the rim by a locking element which includes, at least laterally, an appreciably flat locking surface. In such working variant, the ring 13 includes a protuberance 140 on its radially inner face 130. On one of the sides of said protuberance 140, there is a locking surface 14, which is appreciably continuous circumferentially, oriented here approximately in a plane perpendicular to the axis of the ring 13.

The height in the radial direction of the bearing surface 14 is denoted by H. The use of a groove on the radially inner face 130 of the ring would offer an equivalent solution from a standpoint of relative securing between tire and rim. However, the protuberance is more indicated in case the rim is cylindrical (taper free, step free), the alternative solution being rather to envisage whether the diameter under the ring on the side opposite the one on which the tire is fitted is designed for a value greater than or equal to the outer diameter of the corresponding protuberance then provided for on the rim.

Figure 6:
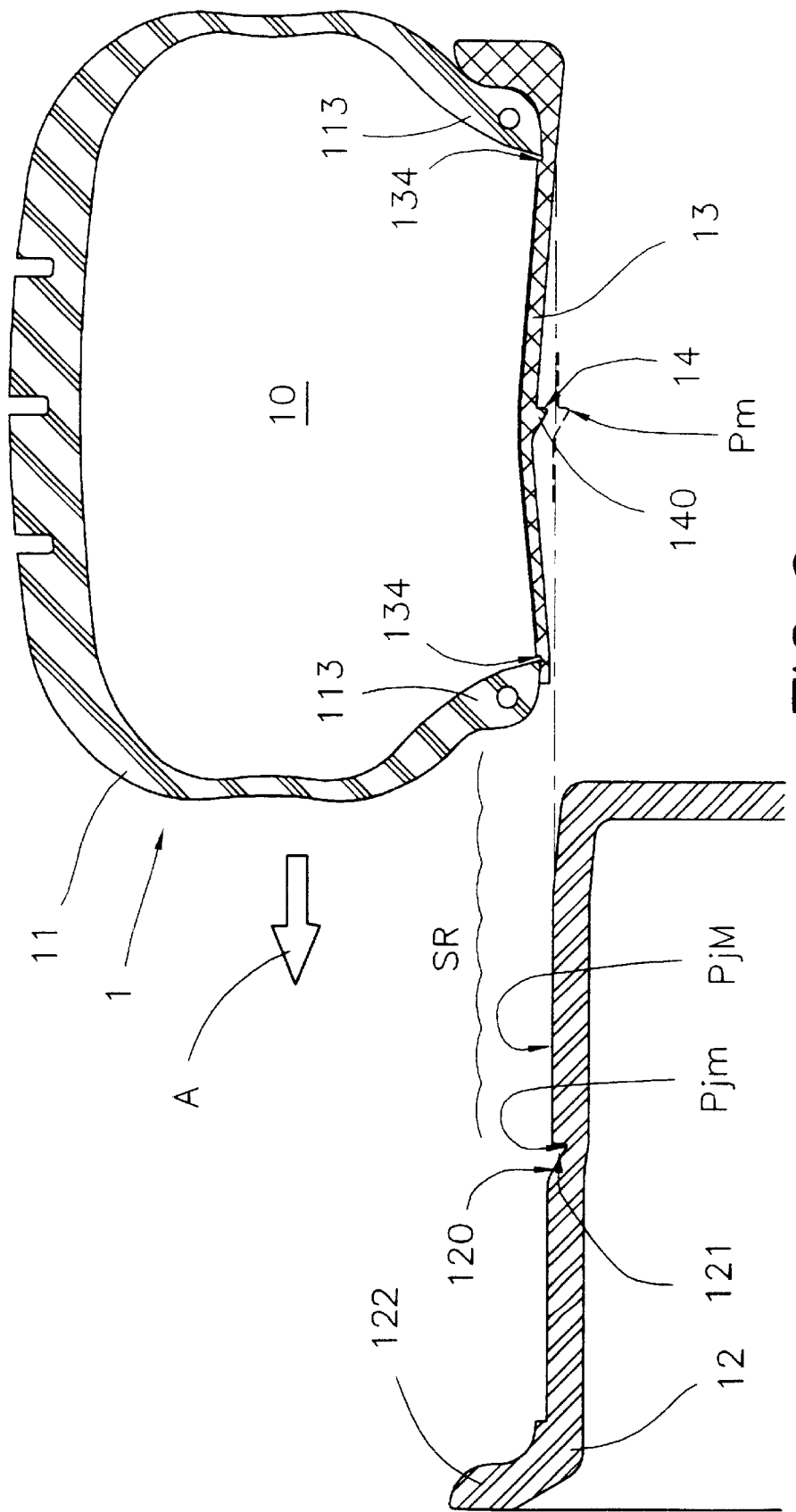
FIG. 6 shows the tire of that first variant in the process of mounting on the rim.
Figure 7:
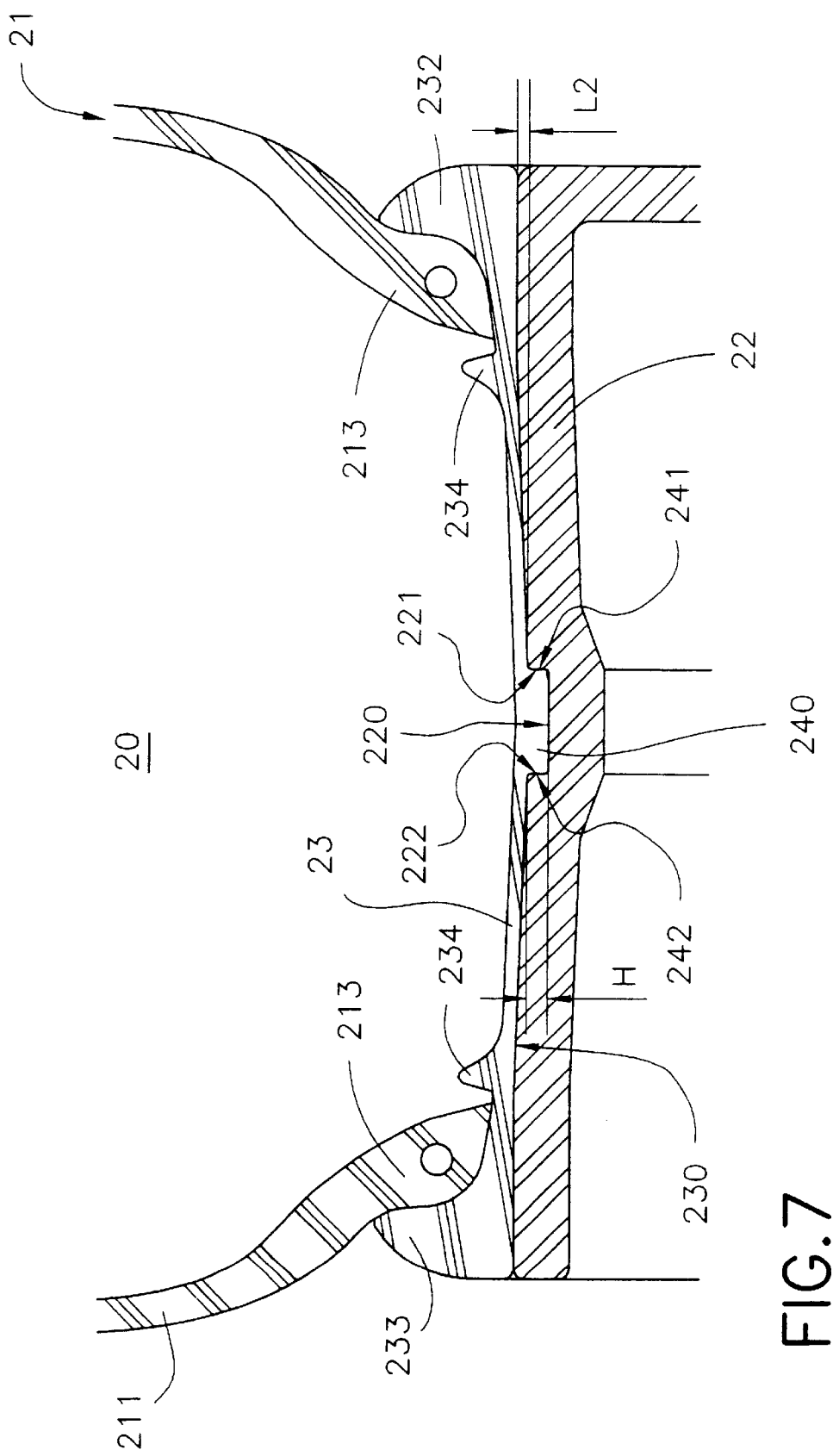
FIG. 7 shows a second working variant of a tire and rim assembly belonging to the first family.
Figure 8:
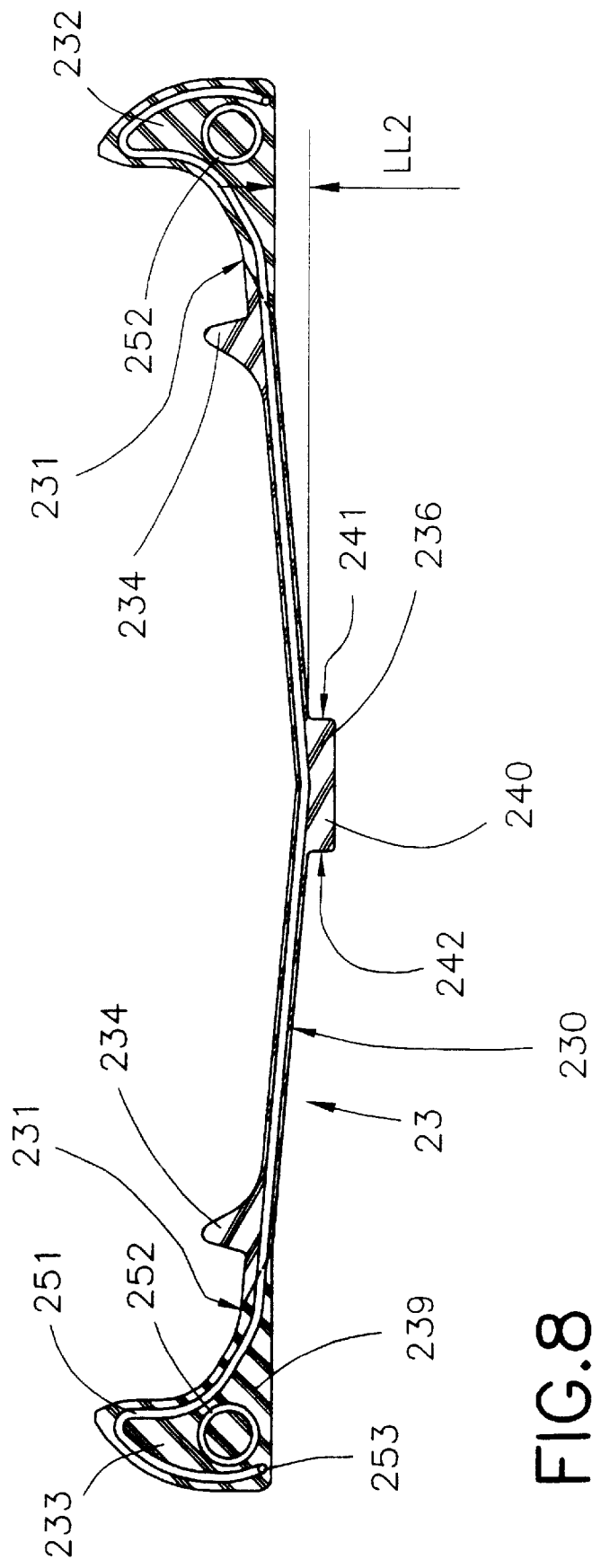
FIG. 8 is a more detailed view of the ring used in that second variant.

It was indicated in the general specification of the invention that mounting of the tire on its rim and holding in position resort to a clamping technique. A vacuum created in the inner cavity 10 of the tire makes it possible to render the clamping means inoperative on mounting or demounting of the tire on or off its rim. That vacuum makes possible a radial expansion of the mounting base supporting the locking element (protuberance 140 here). It is therefore understandable that the design of the mounting base (ring 13 here) must make possible the required radial expansion. As can be seen in FIG. 6, when the tire casing is subjected to the affect of a vacuum prevailing in the chamber 10, the bearing surface 14 on the protuberance 140 is radially separated by a value sufficient for the lowest point of the latter to be on a circle of radius sufficient to make it possible to displace the tire laterally and to fit it on the rim with a slight play allowing for easy mounting.

Figure 3:
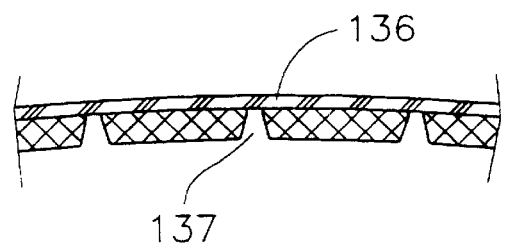
Figure 4:
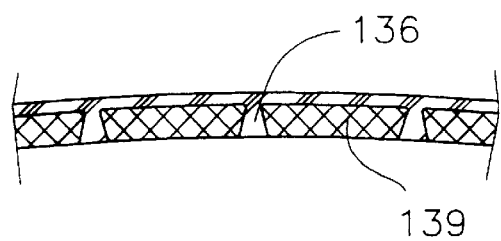

It can be seen especially in FIGS. 2 to 5 how the ring is made to permit the necessary extensibility in diameter. The ring is essentially made of plastic with relatively high modulus. To provide the radial extensibility required, the median part, situated between the seats 131, includes slits 137 oriented roughly axially. Thus, radial expansion of the median part is opposed only by the bending strength of the strips 139 thus defined between the slits 137. The radial cutting plane of FIG. 2 passes through a slit 137, while the radial cutting plane of FIG. 5 passes through a strip 139. The slits 137 are sealed by a material 136 with very low modulus of elasticity in order to render the chamber 10 tight. FIGS. 3 and 4 are views along "aa" in FIG. 2 of two possible alternatives for arranging the material 136. Either the material 136 forms only a skin on the entire radially outer surface of the ring 13 (FIG. 3), or the slits 137 are filled with said material 136. For example, said material 136 is butyl rubber. In all cases, the material is chosen not to oppose an increase of diameter of the median part of the ring 13.

The locking element on the ring (here, in particular, protuberance 140), axially away from the sides, presents in a state free of any stress a minimum perimeter (Pm), which is measured under the protuberance 140 (the stress-free state is represented in broken lines in FIG. 6, showing only the protuberance and its direct environment, on the right of the figure). Furthermore, as can be seen in FIGS. 1 and 6, the rim 12 has a support area situated in the radial projection of the base, consisting here essentially of the ring 13. The support area presents a minimum perimeter (Pjm) which is opposite the part of the concurrent locking base, when the tire is considered in mounting position on the rim. Axially on at least one side (SR) of the part presenting the minimum perimeter (Pjm)—see FIG. 6—, the rim 12 presents an area having a maximum perimeter (PjM) greater than (Pjm), and the entire rim situated on the same side has a perimeter less than (PjM) in any axial position. In other, words, the rim is devoid of a rim flange (in the standard sense of a flange extending radially toward the greater diameters) on side SR. Said minimum perimeter (Pm) of the locking element on the tire is less than the maximum rim perimeter (PjM). Said locking element and said base around said locking element are elastically extensible under the action of a vacuum in said tight chamber of the tire, as clearly shown in FIG. 6. Said minimum perimeter (Pm) of the base at the locking element (on the tire) is less than or equal to the minimum rim perimeter (Pjm).

As indicated by the present invention, after having inserted the ring 13 under the bead 113, the pressure in the inner cavity 10 is slightly reduced, which implies that a tight contact is made of the tire casing on the ring. The sizing of the elements is such that sufficient tightness is secured. This vacuum (0.1 to 0.2 bar is removed to reach an absolute pressure in the order of 0.8 to 0.9 bar) initially makes it possible to keep the tire casing 11 in close contact with the ring 13, each of the beads 113 being retained on its seat 131 by sufficient friction and/or by a small shoulder such as 134. The same vacuum is sufficient for the ring designed as indicated above to be suitably deformed, without the tire being awkwardly deformed. The tire would be awkwardly deformed if, even just locally, it prevented said ring from increasing in diameter. Such a vacuum is easily attained with most household vacuum cleaners. It can also be arranged to deliver the tires to the dealer or to the ultimate consumer when the suitable vacuum prevails in the chamber 10, on condition that certain ambient temperature values are observed. Let us note that, with valve closed and chamber at zero pressure, an appreciable reduction of ambient temperature, in the order of 30° C., makes it possible to create a vacuum in the order of 0.1 bar. Therefore, cooling the tire sufficiently after having closed the valve when it is at zero relative pressure could make it possible in some cases to create a sufficient vacuum.

Then, keeping the axes of the rim 12 and of the mounting base (ring 13 here) of the tire appreciably merged, the tire 1 is fitted on the rim 12 in a translation depicted by arrow A. Taking into account the limited weight of a passenger vehicle tire, this can be easily done by hand.

The mounting base is preferably so designed that there is no tightening under the seat of the bead between ring and rim, or else at least easily reversible tightening at zero pressure in the air chamber, in order to make possible easy positioning on simple mounting and demounting by simple relative translation between rim and tire. The simple relative translation mentioned here does not rule out some recentering movements to keep the friction between tire and rim as low as possible during the operation.

It can be seen in FIG. 1 that the rim 12 has only one flange 122. After relative translation, when the left bead 113 in FIG. 6 abuts the flange 122 of the rim 12 (that is, when it is in the configuration of FIG. 1), the tire is in final place on the rim and the vacuum in the tight chamber of the tire can be eliminated. The protuberance 140 is then engaged in the groove 120 which makes possible the clamping of the tire on the rim, as can be seen in FIG. 1. A variant mounting procedure provides that, when the tire has begun to be fitted and before the tire takes its final axial position relative to the rim, the pressure is reduced, so that the securing means cooperate with the rim before it takes its final place on said complementary bearing surface. Applied to the first variant, the protuberance 140 will rub the surface of the rim on side SR and thus immediately enter the groove 120 as soon is possible. Securing is thus immediate as soon as the tire abuts the flange 122.

The locking element thus cooperates with the rim in opposing any relative movement of the tire in relation to the rim at least axially toward side (SR). In this variant, the tire includes a locking surface 140 and the rim a complementary bearing surface 121, oriented approximately in a plane perpendicular to the axis. On clamping, the protuberance 140 enters the groove 120. Bearing of the locking surface 14 on the complementary bearing surface 121 on the rim opposes a movement of the tire in the direction opposite to arrow A. By virtue of the design of the ring 13, the rest position is such that the protuberance 140 remains engaged in the groove 120, rendering demounting of the tire from the rim impossible outside of a pressure reduction of the air chamber 10. Securing of the tire 11 on its rim 12 is thus sufficiently positive, at least as positive as in the known solutions of the present state of the art, for the vacuum is almost impossible to obtain accidentally. In this position, holding of the tire on the rim 12 is comparable o the holding of a tire casing (meeting the ETRTO standards in force today) on a rim (meeting the ETRTO standards in force today), when the inner cavity of the tire casing is at atmospheric pressure.

When such a tire is inflated, the beads 113 tend to separate axially from each other. Bead displacement is opposed by the flange 122 and the flange 132, which is held by the locking surface 14 which abuts the complementary bearing surface 121, and by friction between base and rim.

In order to demount the tire off its rim 12, one proceeds as follows. First of all, the inflation pressure inside the tire casing 10 is eliminated. Then, a sufficient vacuum is created inside the tire casing 10 to disengage the protuberance 140 from the groove 120. It is completed by axially sliding the tire off the rim until the ring comes completely off the rim.

In other embodiments (FIGS. 7 to 18), the tire includes two bearing surfaces appreciably continuous circumferentially and oriented appreciably radially and forming faces axially oriented opposite each other, each of said bearing surfaces being intended to cooperate with a complementary bearing surface arranged on the rim in order to secure the tire axially on the rim in both axial directions.

FIGS. 7 to 10 show a second working variant of the first family. One can see a tire casing 21 having two beads 213 and a rim 22 devoid of any flange. The rim has a groove 220 arranged roughly in the middle of the latter, which is circumferentially continuous. Two complementary bearings 221 and 222 are shown on both sides of the groove 220. The radially outer surface of the rim 22, on both sides of the groove 220, has slightly truncated cone-shaped parts (see difference of radii L2 in FIG. 7). The area of greater diameter being axially outside each side of the rim.

A symmetrical ring 23 is shown. The ring 23 has a protuberance 240 and, on both sides of the latter, circumferentially continuous bearing surfaces 241 and 242. The ring 23 has two outer flanges 232 and 233 and two inner flanges 234. In said variant, as is better evident in FIGS. 8 to 10, the ring 23 is made of rubber 239 reinforced with radially arranged reinforcing wires 251. The radially inner surface 230 of the ring 23, on both sides of the protuberance 240, has slightly truncated cone-shaped parts (see difference of radii LL2 in FIG. 8), the area of greater diameter being axially outside each side of the rim.

Let us mention here another aspect of the invention. The securing means, as already indicated are not necessarily localized, contrary to what appears in the examples above. Said securing means can consist of the median part of the base forming an elastic belt radially and spread out axially, the said complementary bearing arranged on the rim being adapted to said elastic belt. To illustrate that variation in design, let us consider that the dimension LL2 is rather appreciably greater than the value of dimension L2 (a value of LL2 has been shown on FIG. 8 which is greater than the value of L2 oil FIG. 7). After mounting of the ring 23, the result is a hooping effect spread out over most of the width between the beads 213. The hooping force depends, of course, on the dimensions considered and on the moduli of the materials used to form the ring 23. That hooping effect could make it possible to pass over the protuberance 240.

Of course, a hooping effect is also useful to reinforce securing by clamping. The invention offers numerous possibilities of conceiving of the securing of a tire on a rim and also several variants for securing mounting and demounting. The reader's attention is called to the fact that many of the characteristics of the product or method described can be used independent of each other. For example, what was stated about the degree of flexibility also concerns securing by or with the aid of a hooping effect; the mounting base may or may not form a single piece with the tire; in the case of a separate ring, it can, of course, be plastic, include slits 137 sealed by a material 136 with very low modulus of elasticity, and be mounted as indicated, etc.

Figure 9:
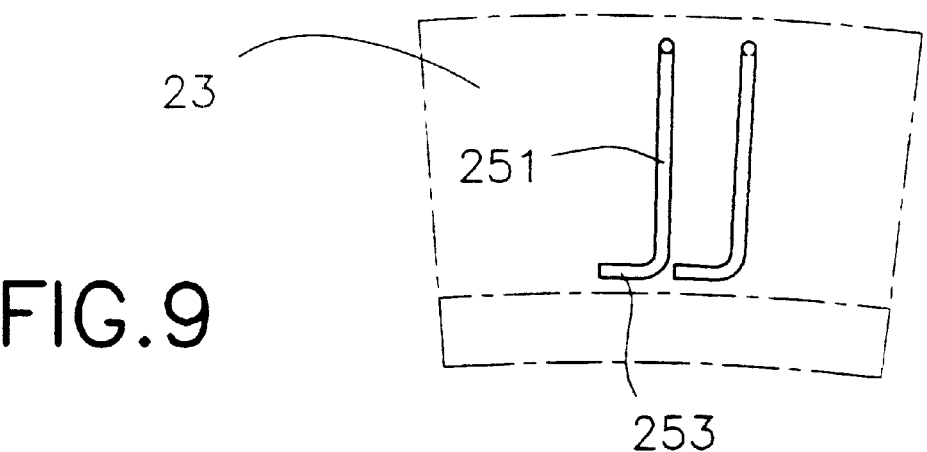
FIG. 9 is a partial side view showing the arrangement of a reinforcement inside the same ring.
Figure 10:
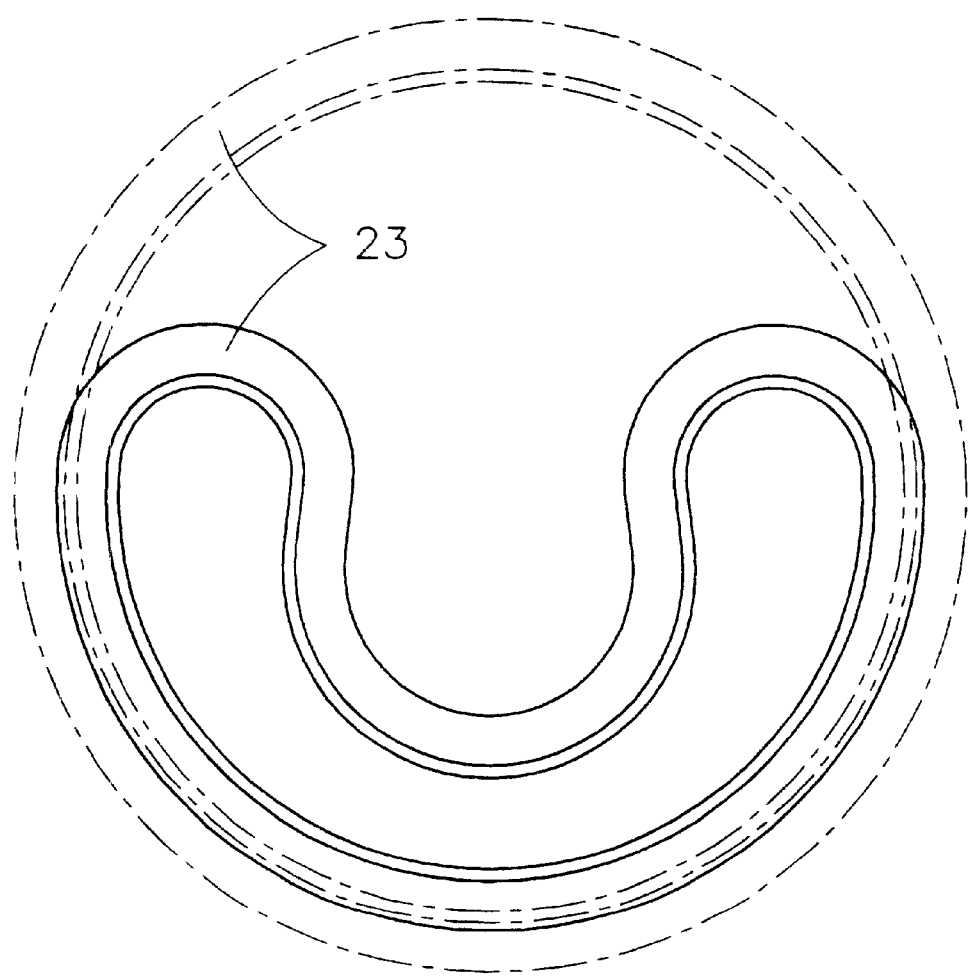
FIG. 10 shows the same ring in the course of mounting in the tire casing.
Figure 11:
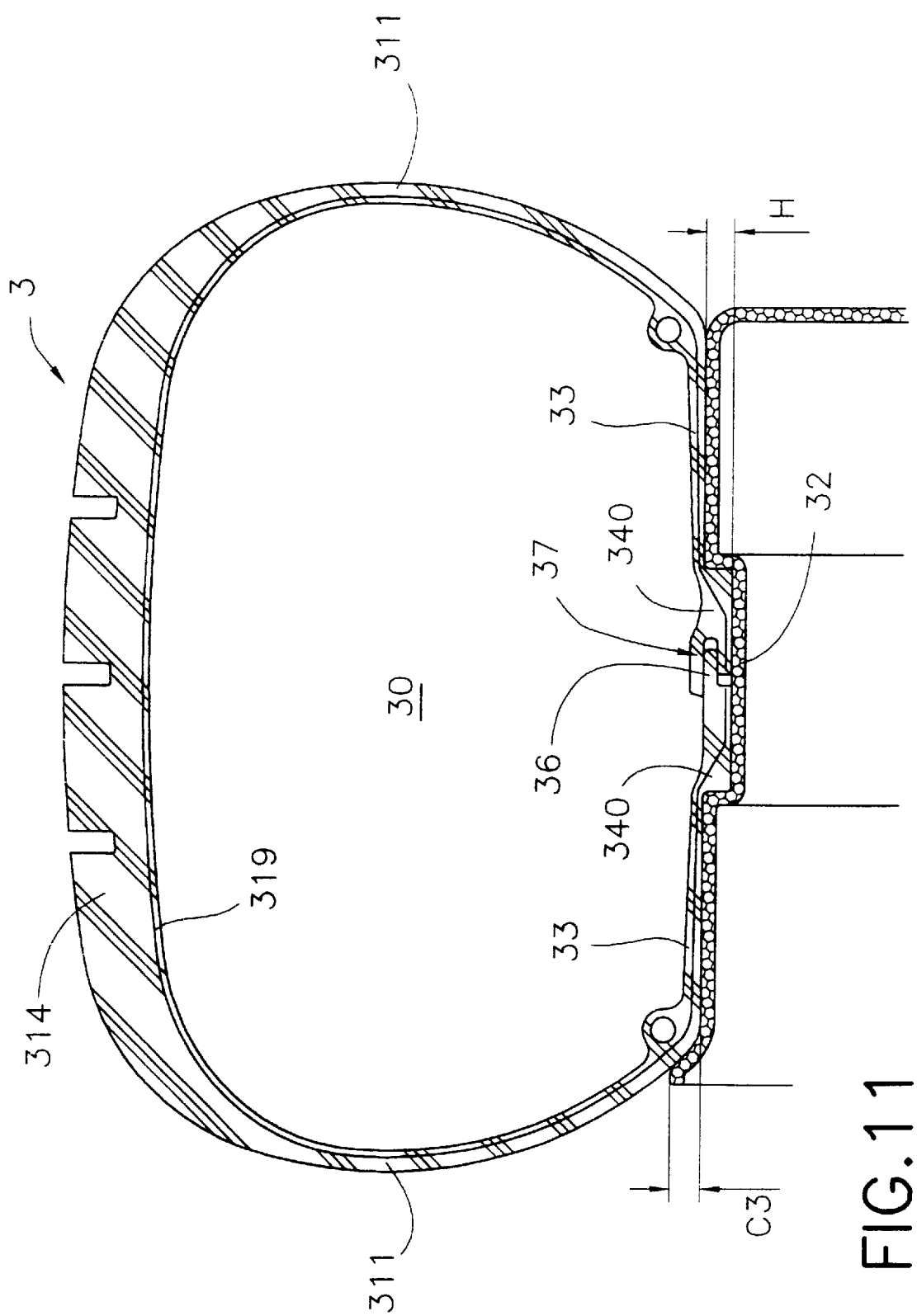
FIG. 11 shows a third working variant belonging to the second family.

Returning to the ring 23, the outer flanges 232, 233 can be reinforced with spiral springs 252 which help support locally the reinforcing wires 251. In each flange, the reinforcing wires 251 are bent back at their ends 253, as shown in FIG. 9, so that the wires 251, through working stresses, do not risk penetrating the rubber matrix they reinforce. The rubber matrix is not necessarily homogeneous, the optimum rubber properties being variable in the different parts of the ring 23. The designed structure must allow diametral expansion of the locking element as well as it must be curvable like a kidney bean (FIG. 10) in order to be inserted under the beads of a tire casing 21.

The tire mounting and demounting operations apply the same step of pressure reduction of the chamber 20 as explained above. This variant differs in that, when the tire is fitted on the rim, no axial stop exists, since there is no flange forming part of the rim 22. When the vacuum is eliminated after having fitted the tire on its rim, it is advisable to watch carefully the clamping of the protuberance 240 in the groove 220, if necessary, by trial and error. As a variant, a small flange is arranged on the rim, the purpose of which is to secure a simpler pre-positioning of the tire on the rim, without that flange playing a bead retaining role under the effect of the tire inflation pressure. Or else, as described for the first variant, elimination or reduction of the vacuum, as soon as the protuberance 240 covers the rim 22 and before it covers the groove 220, enables clamping to take place automatically as soon as the correct position is reached. There again and just as in the other variants, it is possible, by means of suitable sizing of the mounting base, for a displacement greater than the height (H) of the groove 220 to be obtained with a vacuum in the chamber below 0.2 bar.

In the first and second variants, the tire consists essentially of a tire casing and a ring separable from the tire casing, the ring constituting the mounting base, said tire casing consisting essentially of two sidewalls and a crown part, in which each sidewall ends radially inward in a bead, said ring constituting the mounting base, said ring being brought back under and joining the beads. The mounting base, after insertion and mounting under the beads, thereby forms a single sleeve joining the sidewalls and defining with the tire casing a closed toroid containing a tight chamber.

In the following examples (second and third family), the mounting base is molded in a single piece with the tire. In the second family the tire forms a toroid split at the mounting base. The mounting base thereby has two half-sleeves, each integrally joined and molded with one of the sidewalls.

Figure 12:
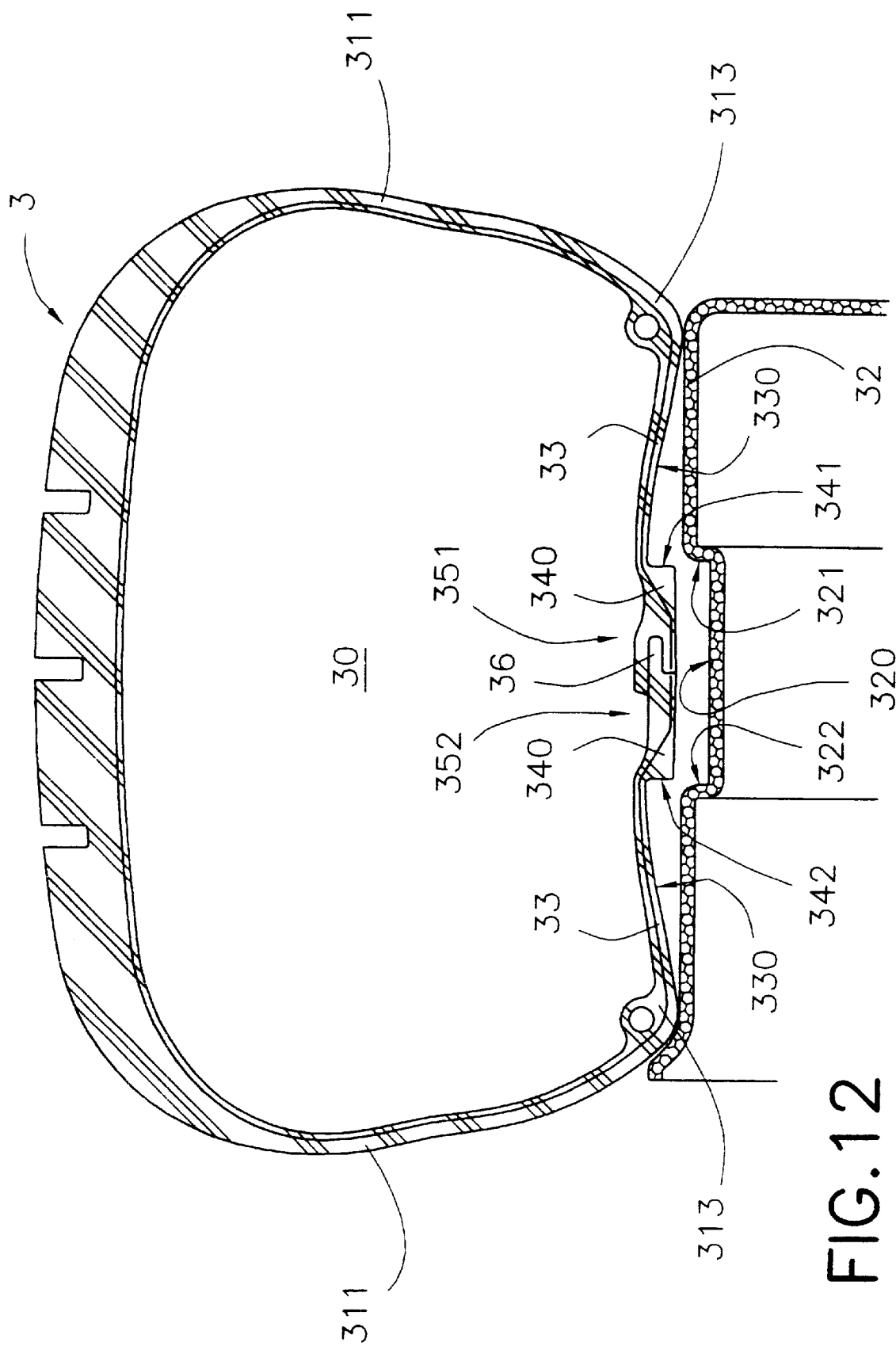
FIG. 12 shows the same third working variant, the tire being in the process of mounting on or demounting from a rim.
Figure 13:
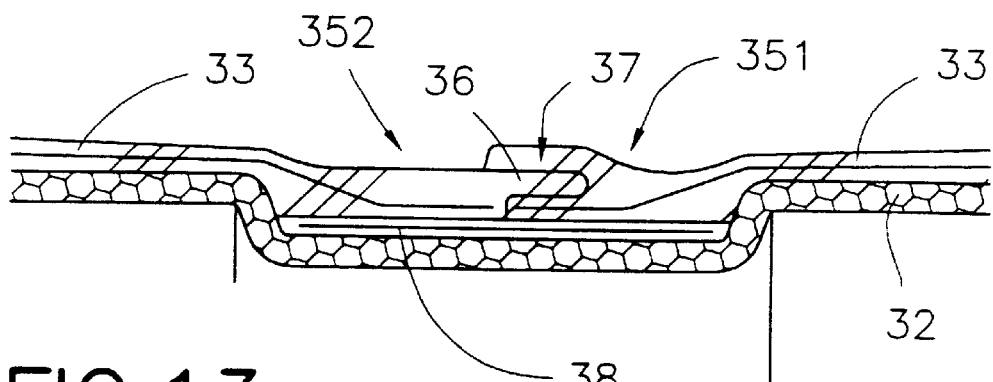
FIG. 13 shows a detail of the tire of the third variant.

FIGS. 11 to 15 show a tire 3 having two sidewalls 311 and two half-sleeves 33 ending in complementary shapes with possible jointing. It can be seen that it includes a carcass reinforcement 319 extending from one end to the other. One of the ends includes a tongue 36. The other end includes a groove 37 with parallel side faces, Once the tongue is inserted in the groove, said ends form a protuberance 340 which is inserted in a corresponding groove 320 of a rim 32. The locking element of height H is thus found to be similar to the variants of the first family. The complementary ends are assembled by bearing on the shoulders formed by each half of the protuberance 340. FIG. 13 shows that tightness of the bond between the two half-sleeves 33 can be improved by applying, for example, by bonding, a sealing tape 38, reinforced or not, covering the joint, and/or by introducing a sealing product like a cement between tongue 36 and groove 37. The bonding chosen is reversible if it is desired to be able to gain access inside the tire for repairs. The tire includes, of course, a valve (not shown) placed, for example, in the right half-sleeve 33, passing under the wire of the bead 313. It can form a boss locally (in the peripheral direction), engaged in an ad hoc recess of the rim. and can thus help stop rotation of the tire on the rim. The recess can be traversing, notably, in order to be able to fit the inner tire of twin mounts from the outside. The boss on the tire can also be traversing (oriented parallel to the axis), even if it is not necessary for installation of the valve.

Mounting and demounting of the tire are similar to what has been explained above. FIG. 12 shows when the chamber 30 is under reduced pressure. The tongue 36 is fully engaged in the groove 37. The lateral bearing surfaces 341 and 342 of the protuberance 340 are slightly closer than the distance existing between the complementary bearing surfaces 321 and 322 on both sides of the groove 320 on the rim 32. Pre-positioning can be facilitated by the optional presence of a rim flange of height C3 (see FIG. 11) which could also be used in the second variant. After elimination of the vacuum, the radially inner face 330 of the mounting base as well as the locking protuberance 340 are firmly applied on the rim 32.

Figure 14:
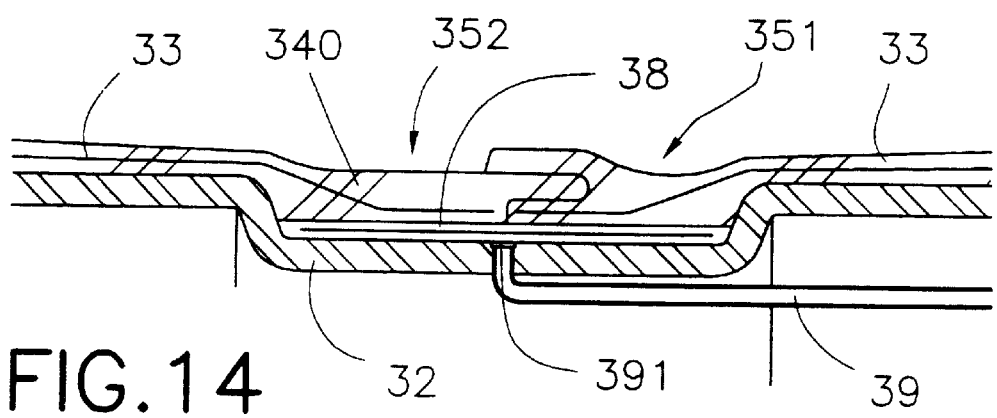
FIG. 14 shows another version of the third variant.

As a variant, FIG. 14 shows that a duct 39 leads to a hole 391 situated on the radially outer rim surface, just below the tape 38 placed under the protuberance 340. This makes it possible, in order to obtain a pressure difference between both sides of the mounting base, instead of lowering the pressure prevailing in the tire chamber under atmospheric pressure, to inject a fluid under pressure between the rim and the mounting base. The same hole 391, in normal use, serves to vent the confined space between the mounting base and the rim. Of course, this demounting principle can also be used with the other variants of the invention.

The mounting base is preferably designed so that there is no tightening under the bead 313 against the rim, or else at least a tightening easily reversible at zero pressure in the air chamber, in order to permit easy positioning on ordinary mounting and demounting by simple relative translation between rim and tire. The same remark applies to the other variants; facilitating mounting by relative translation, as explained, results in not making provision for tightening on the rim, at least during the mounting phase. Transmission of the torque between tire and rim takes place, however, under good conditions, thanks to the wide contact surface existing between tire and rim on the largest part of the mounting base which, since it is flexible enough to expand radially, as explained, consequently transmits very well to the rim the thrust due to inflation pressure. The tire being inflated at service pressure, considerable contact pressure therefore appears between the mounting base and the rim.

Figure 15:
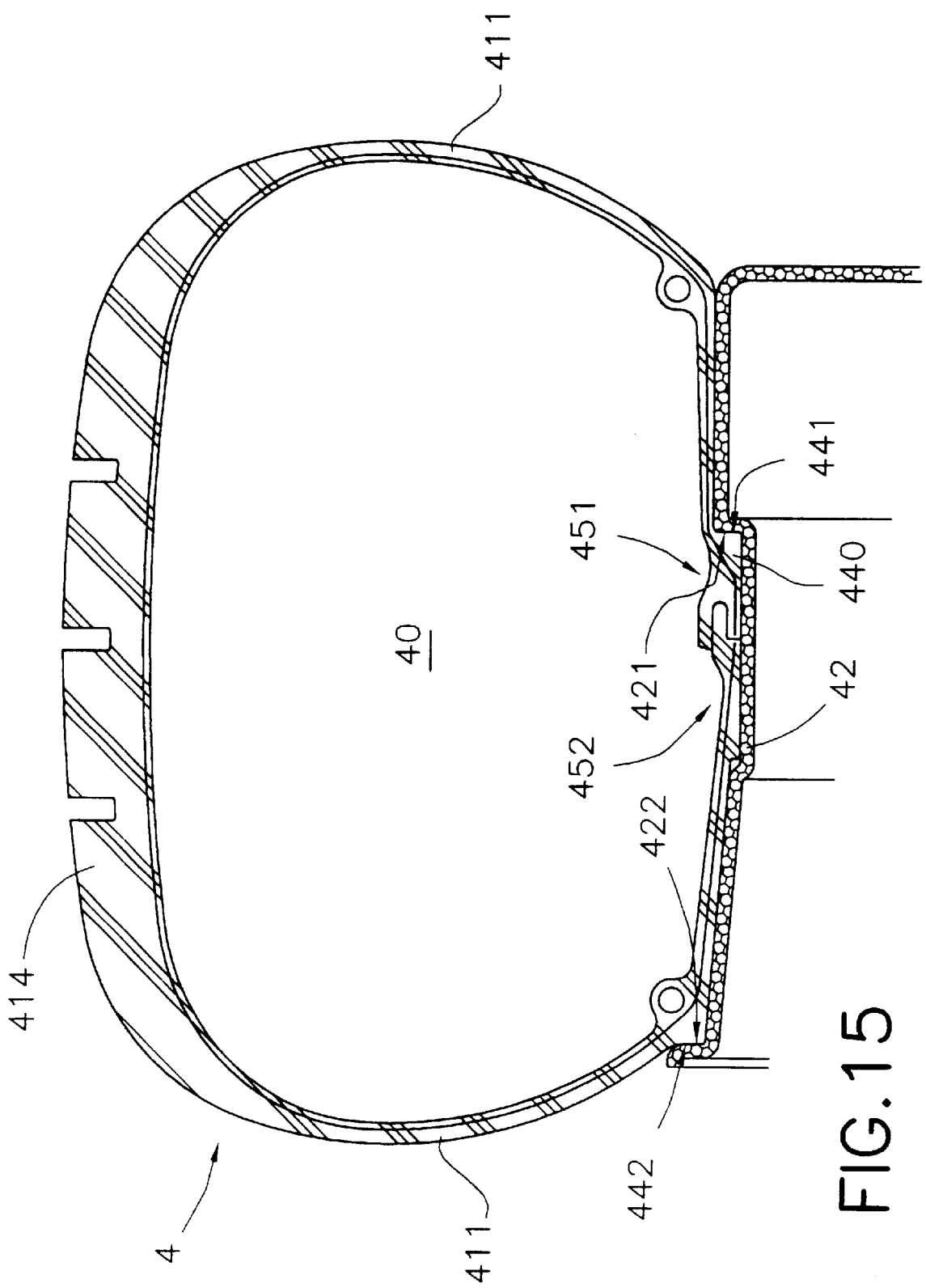
FIG. 15 shows a fourth working variant belonging to the second family.
Figure 16:
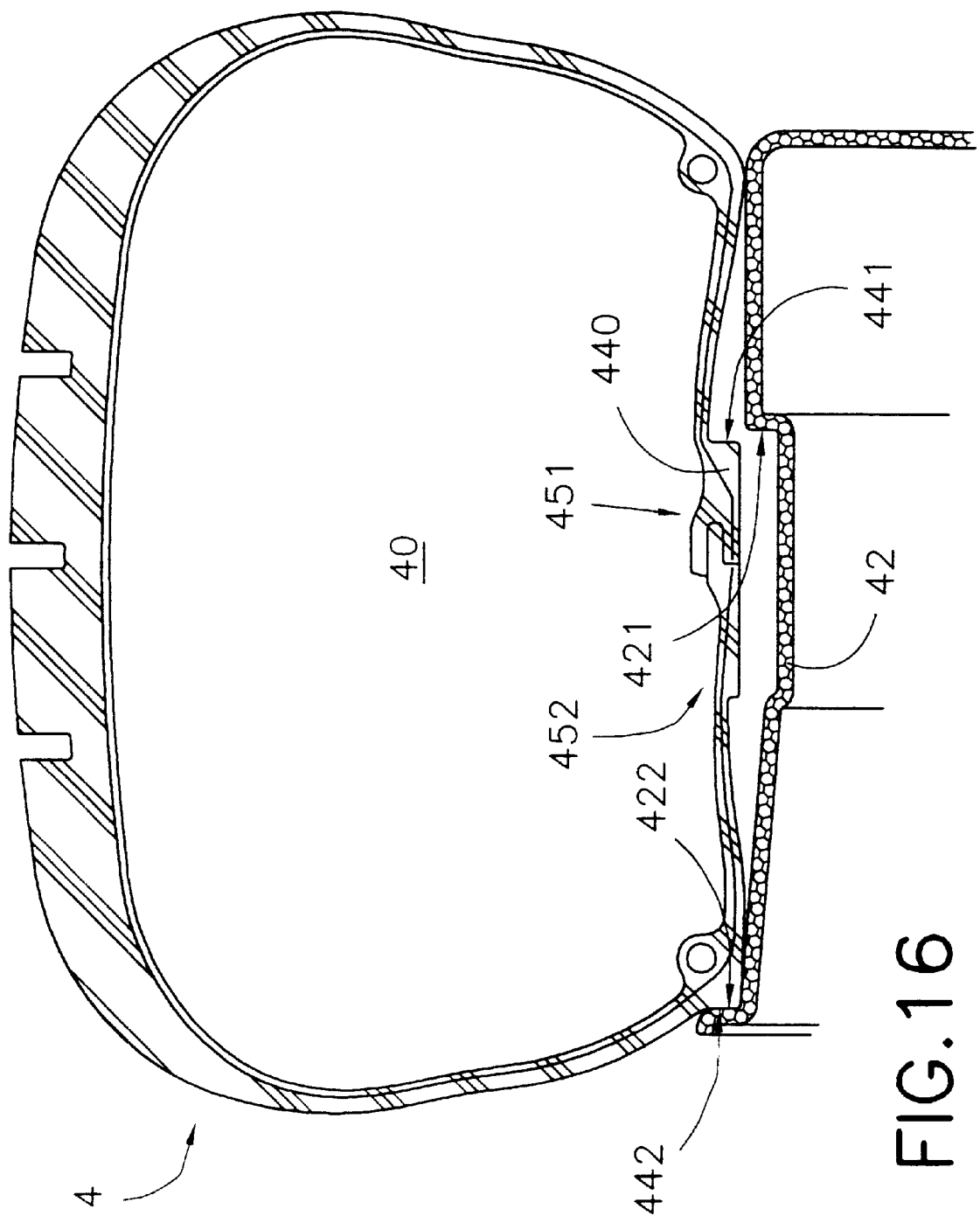
FIG. 16 shows the same fourth working variant, the tire being in the process of mounting or demounting.

The fourth variant illustrated in FIGS. 15 and 16 differs from the third in the relative spacing of the bearing surfaces 441 and 442. In this case, a rim 42 is used, which necessarily has a flange 422 playing the standard role of axial positioning of the left bead 413. The greater relative spacing between the bearing surfaces 441 and 442 means that, on reduction of pressure of the chamber 40, the relative coming together of the bearing surfaces 441 and 442 does not take place by movements at the junction, but mainly by reduction of the length of the sleeve between said bearing surfaces 441 and 442. This makes it possible to create more easily a play which can be greater between the bearing surface 441 and complementary bearing surface 421 on the rim. This facilitates securing placement and allows for wider manufacturing tolerances on the tire and on the rim. Outside of that, the construction of the tire 4 and mounting and demounting on and off the rim 42 are comparable.

Figure 17:
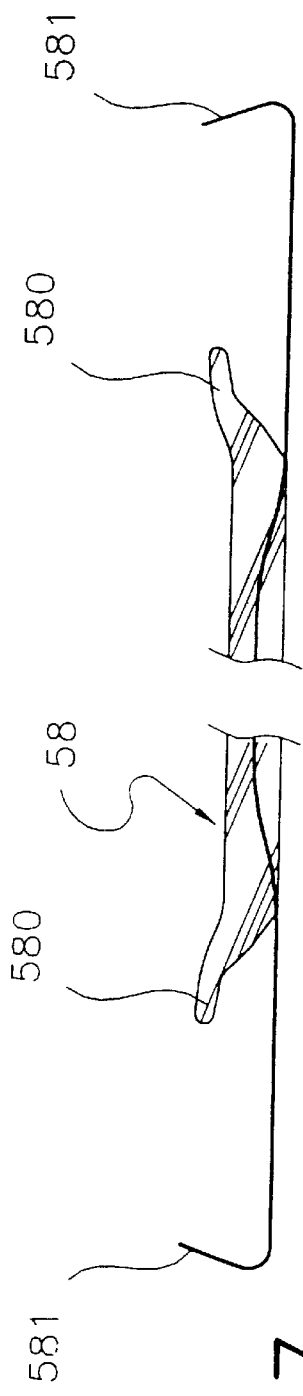
FIG. 17 is a view of a brace used in a fifth variant.
Figure 18:
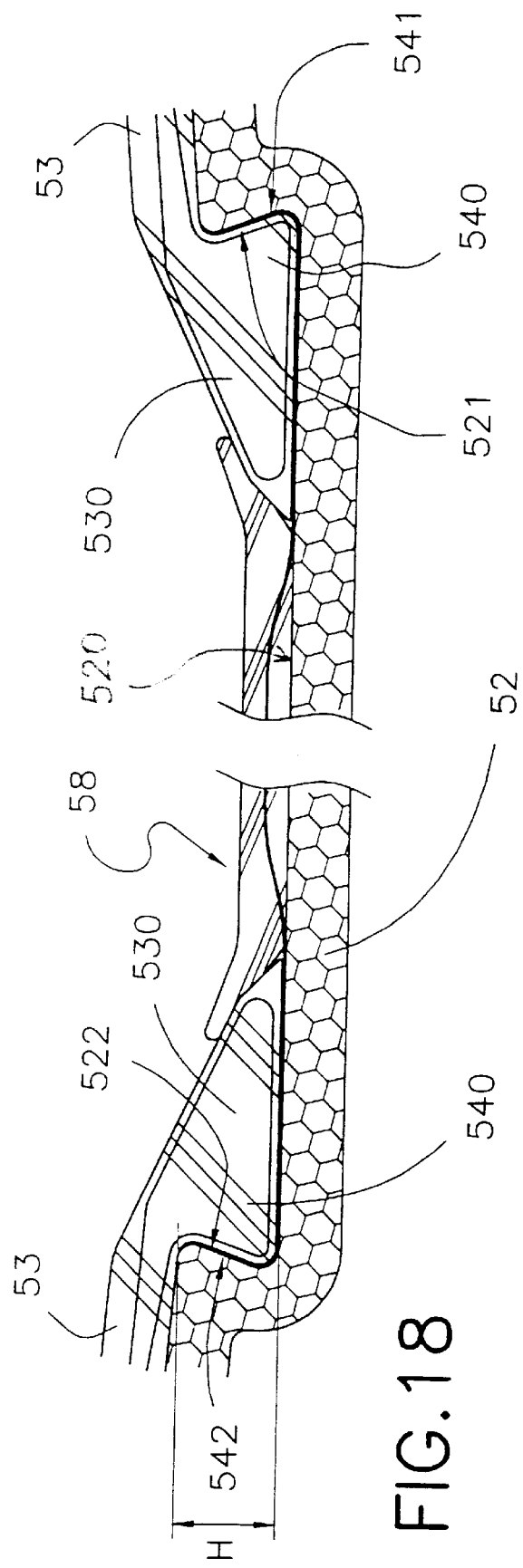
FIG. 18 is a partial view of the fifth variant in mounting position on the rim.

The fifth variant, illustrated in FIGS. 17 and 18, has half-sleeves 53 with identically shaped ends 530. One encounters the protuberances 540 of height H and the locking surfaces 541 and 542 as well as the complementary bearing surfaces 521, 522 on both sides of a groove 520 arranged on the rim 52. An element forming a brace 58 is inserted between said ends 530 to close the chamber and secure tightness. In FIG. 17, a radial section of the brace 58 shows that it consists essentially of a rubber molded center part, in which, for example, a number of rigid plastic or metal studs is sunk, arranged essentially parallel to the axis of rotation and projecting laterally on both sides to form fastening hooks 581. Said brace 58 includes lips 580 intended to bear laterally and radially toward the axis of rotation on the ends 530 of the half sleeves 53, while the fastening hooks 581 are intended to be radially inserted under the ends 530 of the half-leeves, going, for example, up to the bearing surfaces 541 and 542. The fastening hooks 581 make it possible to pre-position the brace 58 correctly on the half-sleeves 53, while securing sufficient tightness at the same time on reduction of pressure of the inner chamber of the tire and on inflation of the tire.

The sixth and seventh variants below (third family, FIGS. 19 to 21) show closed toroidal tires 6 and 7, forming, on manufacture, a tight inner cavity 60 or 70. The mounting base forms a single sleeve joining the sidewalls and integrally molded with the latter. A locking element can be provided in the form of a protuberance or localized groove. This application of the invention does not require further comment. The reader is referred to the description of the preceding variants, for after closing by bringing the half-sleeves in contact, a closed toroid is created in the variants of the second family.

Figure 19:
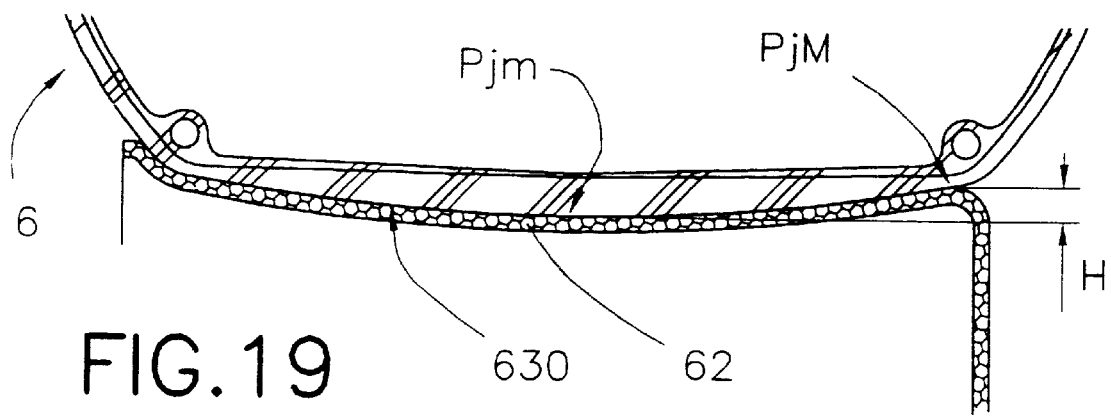
FIG. 19 shows a sixth working variant, belonging to the third family, in mounted position on the rim.

FIG. 19 shows a variant where the securing means is a progressive extra thickness spread along the mounting base. The height H represents the difference of radius between the location of smaller perimeter Pjm on the rim and the location of greater perimeter PjM. Mounting and demounting take place as explained above.

Figure 20:
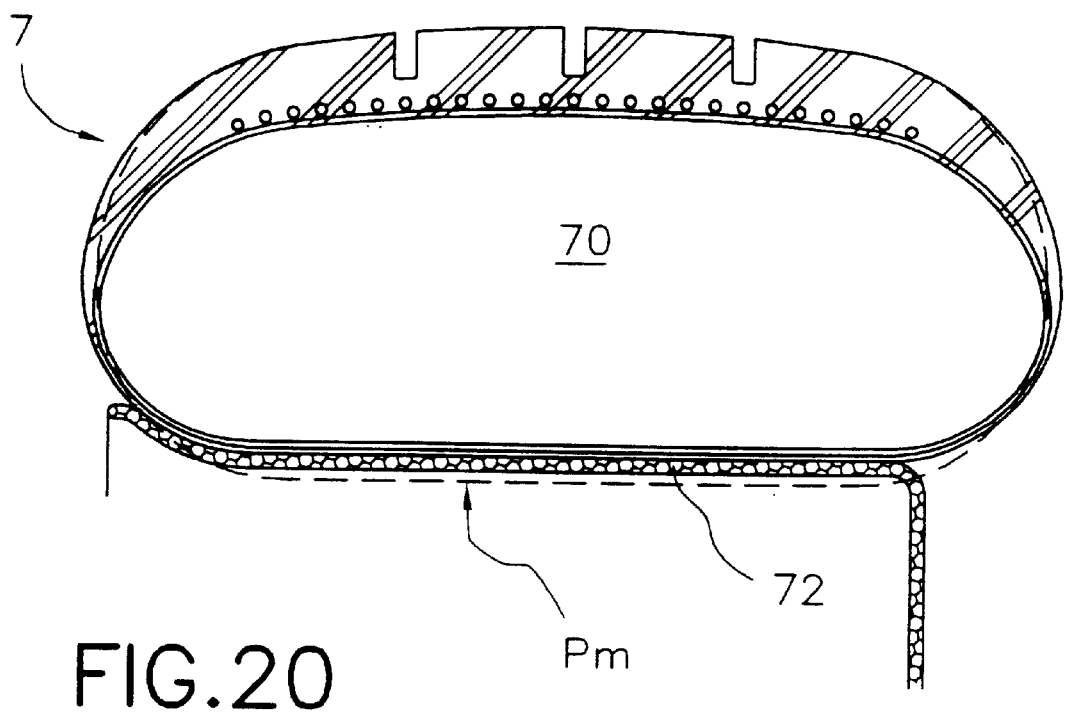
FIG. 20 shows a seventh working variant, belonging to the third family, in mounted position on the rim.
Figure 21:
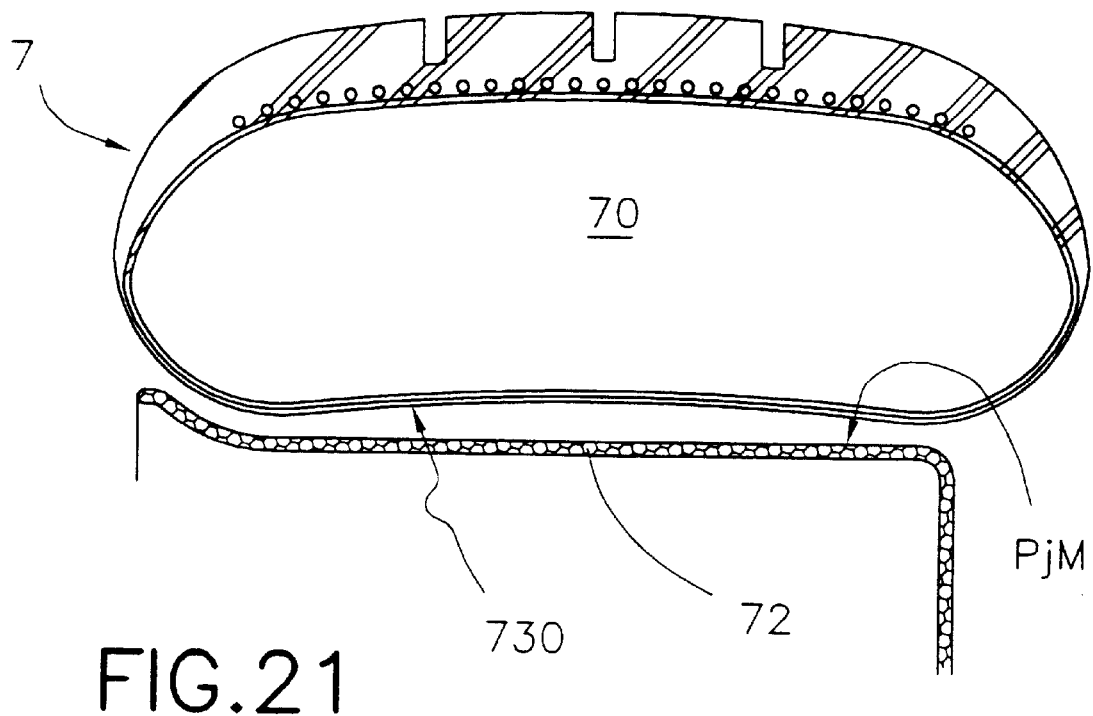
FIG. 21 shows the seventh working variant, the tire being in the process of mounting on a rim.

FIGS. 20 and 21 show a tire 7 in which the minimum perimeter Pm of the tire 7, outside of any stress (see broken line in FIG. 20) is less than the rim perimeter PjM, which is constant here over the whole support area. Such a tire includes a tubular radial carcass, that is, present at least in the sidewalls and in the mounting base. In the area corresponding to the mounting base at least, it does not include wire or other types of reinforcement likely to oppose movements of radial extensibility of said mounting base. The tire can be mounted and demounted on and off the rim by fitting, as explained for the first family, with the assistance of reduction of pressure of the inner cavity 70. In order to be deformed as shown in FIG. 20, the tire "is supported" on the crown part of the latter. Such a tire 7 is mounted and positioned on a rim 72 by natural hooping alone, when the vacuum is eliminated (hooping spread out).

The tires 6 and 7 are manufactured and vulcanized on a support of suitable shape. The tires are extracted from their support after vulcanization in the same way as on demounting of the tire on and off the rim, namely, by applying a reduction of pressure of the inner cavity of those tires. These are also examples of securing means not localized, but spread out axially.

In these sixth and seventh variants as well, when the internal pressure of the air chamber 50 becomes nil, the tire remains on its rim. Depending on the residual contact pressure that the radially inner wall 630, 730 of the tire exerts on the rim 62, 72, the tire has the capacity to function at zero pressure appreciably the same as in the solutions currently in use in the present state of the art.

Figure 22:
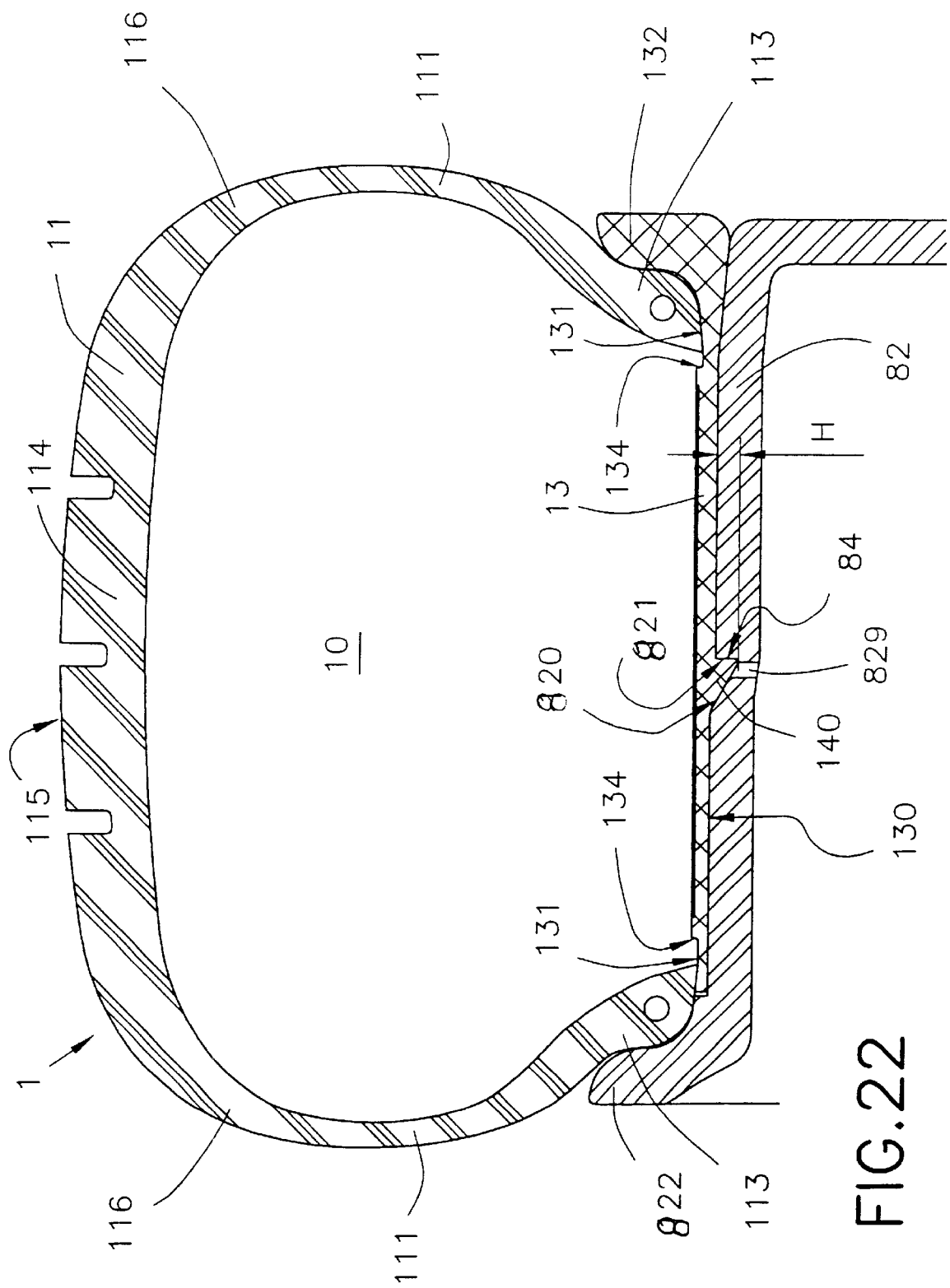
FIG. 22 shows an eighth working variant, in which the tire is the one from the first variant and the rim is different.
Figure 23:
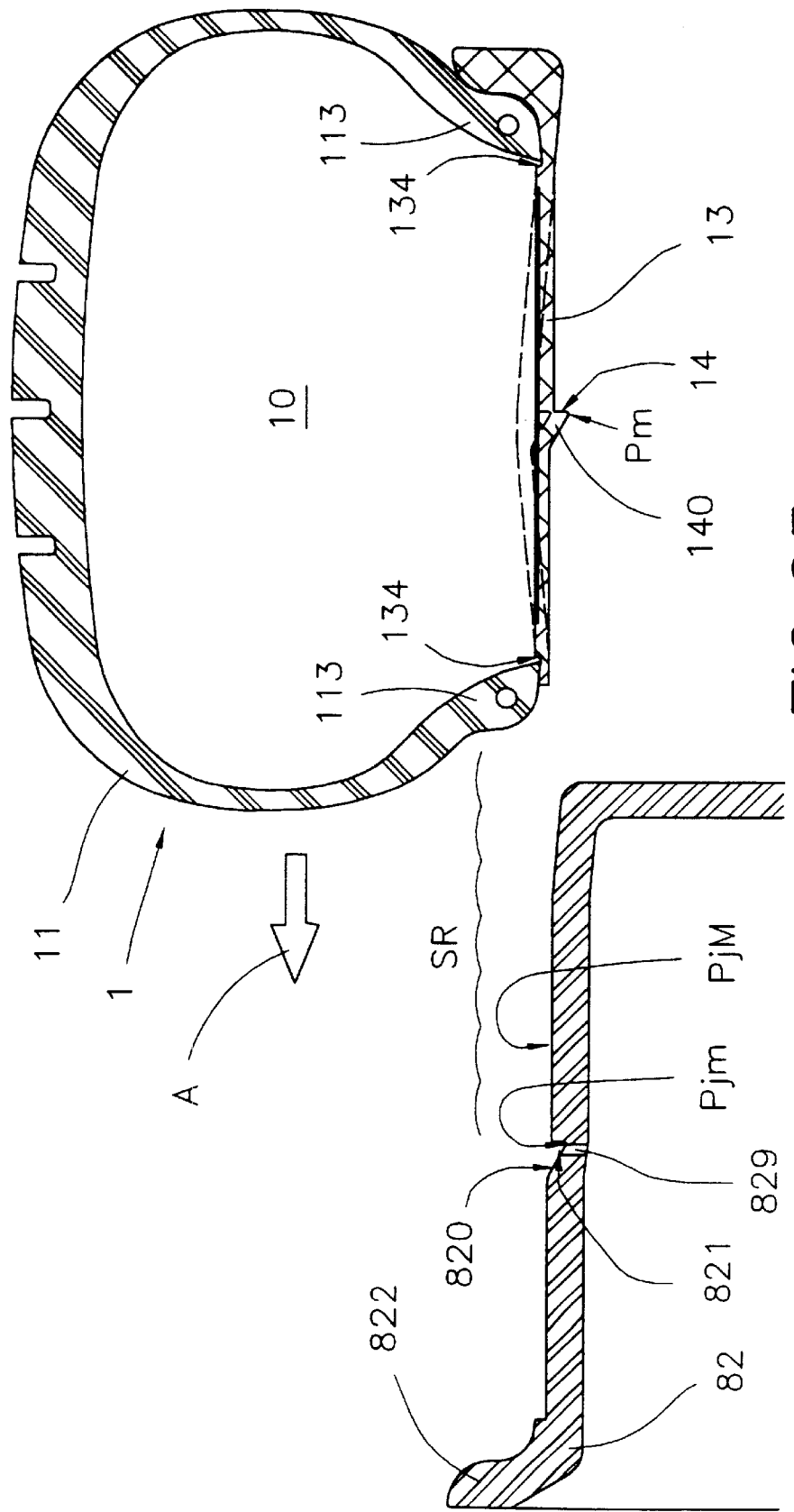
FIG. 23 shows the tire of that eighth working variant, in the course of mounting on the rim.

Finally, FIGS. 22 and 23 illustrate the case of mounting and demounting without reducing the pressure of the tire chamber. The rim 82 includes a single flange 822. It has a groove 820 and a complementary bearing 821 designed to cooperate with the protuberance 140. The adapted rim 82 includes at least one hole 829 making it possible to exert a radial pressure on the securing means in order to stress them radially outward.

The shape of the ring 13 in stress-free state is the one traced in solid lines. The flexibility of the ring 13 enables it, however, to take easily the deformation represented in broken lines on FIG. 23. Mounting is carried out by simple relative translation, by forcing the ring to be deformed when it covers the rim 82. After relative translation, when the left bead 113 on FIG. 23 abuts the flange 822 of the rim 82 (that is, when it is in the configuration of FIG. 22), the protuberance 140 is then engaged in the groove 820, which makes possible automatic clamping of the tire on the rim.

In order to demount the tire from its rim 82, one proceeds as follows. First, the inflation pressure inside the tire chamber 10 is eliminated. Then a fluid is injected under pressure between the rim and the mounting base through hole 829, or else the protuberance is pressed through several holes, such as hole 829, in order to disengage the protuberance 140 from the groove 820. One finishes by axially sliding the tire along the rim until the ring comes completely off the rim. If a fluid is injected under pressure between the rim and the mounting base, the pressure of the latter is rather easily distributed under the entire periphery of the mounting base by the play appearing between the rim and the mounting base (the hole 829, in normal use, serves to vent the space confined between the mounting base and the rim).

Several applications of the invention have just been described. The invention can be adopted in many different contexts. The rim can be integrated with a hydraulic motor, or it can be formed essentially by any mechanical part which can be permanently mounted on the vehicle, since it is no longer necessary to demount the rim in order to demount the tire. For example, for an application to passenger vehicles, if the rim is neither demountable nor tight, an inspection pit for brake inspection and for brake pad replacement can very well be provided.

Let us remember that on a passenger vehicle, the greatest transverse stresses appear on turning on tires situated outside the turn and tend to force the tire back toward the vehicle. Hence, in the asymmetrical variants (FIGS. 1 to 6), it is advantageous for the rim flange to be situated on the inside of the vehicle.

Different variants can be used. For example, the locking surface or surfaces can be locally interrupted, for example, for passage of the valve. Different functional clearances can be provided. For example, value Pjm is the minimum diameter measured on the rim, which does not rule out, for example, a play between the back of the groove on the rim and the protuberance on the tire.

The present invention opens tip a whole range of different possible applications. A tire or a tire and rim assembly designed according to the invention can be mounted, or can be demounted without vacuum, in the inner chamber of the tire. The use of a vacuum facilitates the operation, or makes it possible to design tires or assemblies which would not be mounted or demounted or which it would be very difficult to mount or demount without resorting to a vacuum.

I claim:

1. An assembly including a toroidal tire and a rim, said assembly comprising, when the toroidal tire is in mounted position on the rim:

two sidewalls;

a crown part forming a tread and joined to radially upper ends of the sidewalls;

a base mounted on the rim, said base forming a sleeve extending crosswise from each sidewall in the direction of the other sidewall, radially inner ends of the sidewalls being extended by said base;

said base, sidewalls and crown part forming a closed toroid capable of defining a tight chamber even before the tire is mounted on the rim;

a concurrent locking part situated on the base axially between the sidewalls for locking the toroidal tire on the rim against axial displacement in at least one direction, said concurrent locking part presenting, in stress-free state, a minimum perimeter Pm;

the rim having an axial end for receiving the toroidal tire and a support area in the radial projection of said base when the tire is in mounted position on the rim, said support area directly opposite the concurrent locking part having a minimal perimeter Pjm for receiving the concurrent locking part and, axially on one side of the support area of minimal perimeter Pjm in the direction of the axial end for receiving the toroidal tire, a perimeter having a maximum perimeter PjM greater than Pjm and capable of receiving the toroidal tire for mounting on the rim, the rim from the minimal perimeter Pjm to the axial receiving end for the toroidal tire having a perimeter no greater than PjM, said minimum perimeter Pm of the concurrent locking part being less than the maximum rim perimeter PjM, said concurrent locking part being elastically extensible, so that when the tire is in place on the rim, the concurrent locking part cooperates with the rim in opposing any relative movement of the tire in relation to the rim at least axially toward the mounting end of the rim.

2. An assembly according to claim 1, in which the concurrent locking part includes a locking element in the form of a protuberance or groove arranged on the radially inner face of the base in a position axially away from the sidewalls, said locking element having a predetermined height measured parallel to a radius from the inner face of the base.

3. An assembly according to claim 1, in which the flexibility of the base is such that when the tire is in a closed toroid configuration defining a tight chamber, a reduction of pressure of the chamber produces the desired overall displacement of said concurrent locking part toward a larger radius before producing a deformation of the crown, the extent of which opposes the said displacement of the base toward the larger radius.

4. An assembly according to claim 1, in which the locking element includes at least one appreciably flat, lateral locking surface.

5. An assembly according to claim 1, in which the base is molded in a single piece with the tire.

6. An assembly according to claim 5, in which the tire forming a toroid is split at the base, so that the latter has two half-sleeves, each integrally joined and molded with one of the sidewalls.

7. An assembly according to claim 6, in which the half-sleeves end in complementary shapes for the joiner thereof.

8. An assembly according to claim 6, in which the half-sleeves have ends of identical shape, and in which an element forming a brace is inserted between said ends to close the chamber and ensure tightness.

9. An assembly according to claim 5 in which the base forms a single sleeve joining the sidewalls and is molded integrally with the sidewalls.

10. An assembly according to claim 1, in which the base is a ring separable from the tire casing and in which each sidewall ends radially inward in a bead, said ring joining the beads, so that the ring, after insertion under the beads, forms a single sleeve joining the sidewalls and defining with the tire casing a closed toroid containing a tight chamber.

11. An assembly according to claim 10, in which the ring includes a single outer flange extending radially and cooperating with the axially outer face of one of the beads and is intended to be mounted on a rim having a single flange extending radially and cooperating with the axially outer face of the other one of the beads.

12. An assembly according to claim 10, in which the ring has two outer flanges extending radially and cooperating with the axially outer faces of said beads.

13. An assembly according to claim 11, in which the ring includes an inner flange extending radially and placed axially inside the outer flange, cooperating with the axially inner ace of one of the beads.

14. An assembly according to claim 12, in which the ring includes an inner flange extending radially and placed axially inside the outer flange, cooperating with the axially inner face of one of the beads.

15. An assembly according to claim 10, in which the structure of the ring is so formed that it allows for radial expansion of the concurrent locking part and is curved in the form of a kidney bean in order to be inserted under the beads of the tire casing.

16. An assembly according to claim 1, in which the concurrent locking part is constituted by the median part of the base, which forms an elastic belt radially and spread out axially, said complementary bearing arranged on the rim being adapted to said elastic belt.

17. An assembly according to claim 14, in which the base forms a single piece with the tire.

18. An assembly according to claim 16, in which the base forms a single sleeve joining and integrally molded with the sidewalls.

19. An assembly according to claim 16, in which the base is a ring separable from the sidewalls, each sidewall ending radially inward in a bead, said ring joining the beads, so that the ring, after insertion and mounting under the beads, forms a single sleeve joining the sidewalls and defining a closed toroid capable of defining a tight chamber.

20. A toroidal tire comprising a crown part forming a tread, two sidewalls and a base having an inner face mountable on a rim, the base forming a sleeve extending crosswise from each sidewall in the direction of the other sidewall, radially inner ends of the sidewalls being extended by said base, the base, sidewalls and crown part forming a closed toroid capable of defining a tight chamber before mounting on a rim, the base having a flexible region responsive to the pressure in the chamber to cause displacement between a relaxed position when the pressure in the chamber is at ambient pressure and a position in which the region is radially outwardly stressed when the pressure in the chamber is below ambient pressure, the base further having two joined half-sleeves, each integrally molded with one of the sidewalls, the half-sleeves having ends of identical shape, and including an element forming a brace which is inserted between said ends to close the chamber and secure tightness, and securing means for securing the tire against displacement on a rim in at least one axial direction, the securing means being at the flexible region of the base to impart radial movement to the securing means responsive to the pressure in the chamber to displace the securing means between operative and inoperative positions, said securing means in operative position being adapted to cooperate with a complementary bearing arranged on a rim.

21. A tire according to claim 20, in which the lateral ends of said brace include lips which bear laterally and radially toward the axis of rotation on the ends of the half-sleeves and including fastening hooks inserted radially under the ends of the half-sleeves.

22. A toroidal tire comprising a crown part forming a tread, two sidewalls and a base having an inner face mountable on a rim, the base forming a sleeve extending crosswise from each sidewall in the direction of the other sidewall, radially inner ends of the sidewalls being extended by said base, the base, sidewalls and crown part forming a closed toroid capable of defining a tight chamber before mounting on a rim, the base having a flexible region responsive to the pressure in the chamber to cause displacement between a relaxed position when the pressure in the chamber is at ambient pressure and a position in which the region is radially outwardly stressed when the pressure in the chamber is below ambient pressure, and securing means for securing the tire against displacement on a rim in at least one axial direction, the securing means being at the flexible region of the base to impart radial movement to the securing means responsive to the pressure in the chamber to displace the securing means between operative and inoperative positions, said securing means in operative position being adapted to cooperate with a complementary bearing arranged on a rim, said securing means being constituted by a median part of the base, which forms a flexible belt radially and spread out axially, said complementary bearing arranged on the rim being adapted to said elastic belt.

23. A tire according to claim 22, in which the said degree of flexibility is chosen so that, when the tire is in a closed toroid configuration defining a tight chamber, a pressure reduction of the chamber produces the desired displacement of said securing means toward the larger radius before producing a deformation of the crown, the extent of which opposes the said displacement of the said belt to the larger radius.

24. A tire according to claim 22, in which the mounting base forms a single piece with the tire.

25. A tire according to claim 24, in which the mounting base forms a single sleeve joining and integrally molded with the sidewalls.

26. A tire according to claim 22, in which the base is a ring separable from the sidewalls, each sidewall ending radially inward in a bead, said ring joining the beads, so that the ring, after insertion and mounting under the beads, forms a single sleeve joining the sidewalls and defining a closed toroid capable of defining a tight chamber.

27. A tire according to claim 26, in which the said ring is essentially plastic, and including slits axially oriented to permit the displacement of said bearing or bearings radially, the said slits being sealed by a material of low modulus of elasticity in order to render the said chamber tight.

28. A tire according to claim 26, in which the ring includes two outer flanges extending radially and cooperating with the axially outer faces of the said beads.

29. A tire according to claim 26, including an inner flange extending radially and placed axially inside the outer flange, cooperating with the axially inner face of one of the beads.

30. A tire according to claim 26, in which the structure of the ring allows for radial expansion of the securing means and is curved in the shape of a kidney bean in order to be inserted under the beads of the tire casing.

31. A toroidal tire comprising a crown part forming a tread, two sidewalls and a base having an inner face mountable on a rim, the base forming a sleeve extending crosswise from each sidewall in the direction of the other sidewall, radially inner ends of the sidewalls being extended by said base, the base, sidewalls and crown part forming a closed toroid capable of defining a tight chamber before mounting on a rim, the base having a flexible region responsive to the pressure in the chamber to cause displacement between a relaxed position when the pressure in the chamber is at ambient pressure and a position in which the region is radiallly outward stressed when the pressure in the chamber is below ambient pressure, and securing means for securing the tire against displacement on a rin in the least one axial direction, the securing means being at the flexible region of the base to impart radial movement to the securing means responsive to the pressure in the chamber to displace the securing means between operative and inoperative positions, said securing means in operative position being adapted to cooperate with a complementary bearing arranged on a rim, said tire being adapted to be used with a rim which includes at least one hole making it possible to exert a radial pressure on the securing means in order to force them radially outward.

* * * * *

UNITED STATES PATENT AND TRADEMARK OFFICE
CERTIFICATE OF CORRECTION

PATENT NO. : 6,554,036 B1
DATED : April 29, 2003
INVENTOR(S) : Michel Deal

It is certified that error appears in the above-identified patent and that said Letters Patent is hereby corrected as shown below:

Title page,
Item [73], Assignee, "Etablissments" should read -- Etablissements --

Column 1,
Line 29, "fanning" should read -- farming --

Column 2,
Line 2, "inward" should read -- inwardly --
Line 13, "hereabove" should read -- hereinabove --
Line 67, "outward," should read -- outwardly, --

Column 3,
Line 12, "outward." should read -- outwardly. --

Column 4,
Line 64, "outward," should read -- outwardly, --

Column 10,
Line 51, "o" should read -- to --

Column 11,
Line 50, "independent" should read -- independently --

Column 12,
Line 1, "curvable" should read -- curved --
Line 27, "inward" should read -- inwardly --

Column 14,
Line 4, "half sleeves" should read -- half-sleeves --
Line 6, "half-leeves" should read -- half-sleeves --
Line 67, "outward." should read -- outwardly. --

Column 16,
Line 64, "inward" should read -- inwardly --

Column 17,
Line 12, "ace" should read -- face --
Line 34, "inward" should read -- inwardly --

Column 18,
Line 40, "inward" should read -- inwardly --

UNITED STATES PATENT AND TRADEMARK OFFICE
CERTIFICATE OF CORRECTION

PATENT NO.   : 6,554,036 B1
DATED        : April 29, 2003
INVENTOR(S)  : Michel Deal It is certified that error appears in the above-identified patent and that said Letters Patent is hereby corrected as shown below:

Column 19,
Line 3, "radiallly" should read -- radially --; and
"outward" should read -- outwardly --
Line 5, "rin" should read -- rim --; and
"the" (second occurrence) should read -- at --

Signed and Sealed this

Ninth Day of September, 2003

JAMES E. ROGAN
*Director of the United States Patent and Trademark Office*